(12) United States Patent
Devereux et al.

(10) Patent No.: US 12,079,294 B2
(45) Date of Patent: *Sep. 3, 2024

(54) NAVIGATION TAB CONTROL ORGANIZATION AND MANAGEMENT FOR WEB BROWSERS

(71) Applicant: Microsoft Technology Licensing, LLC, Redmond, WA (US)

(72) Inventors: William J. Devereux, Redmond, WA (US); Jerin R. Schneider, Seattle, WA (US); Olga Veselova, Redmond, WA (US); Patrick Evan Little, Redmond, WA (US); Warren C. Stevens, Redmond, WA (US); Darryl J. Brown, Seattle, WA (US); Michael H. Catbagan, Portland, OR (US); Aaron M. Butcher, Redmond, WA (US); Daniel J. Krenn, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,479

(22) Filed: Nov. 21, 2022

(65) Prior Publication Data
US 2023/0083527 A1    Mar. 16, 2023

Related U.S. Application Data

(63) Continuation of application No. 17/028,737, filed on Sep. 22, 2020, now Pat. No. 11,531,719.

(51) Int. Cl.
*G06F 3/0482* (2013.01)
*G06F 3/0483* (2013.01)
(Continued)

(52) U.S. Cl.
CPC .......... *G06F 16/954* (2019.01); *G06F 3/0482* (2013.01); *G06F 3/0483* (2013.01); *G06F 3/0485* (2013.01)

(58) Field of Classification Search
CPC .... G06F 16/954; G06F 3/0482; G06F 3/0483; G06F 3/0485
See application file for complete search history.

(56) References Cited

U.S. PATENT DOCUMENTS

| | | | |
|---|---|---|---|
| 8,881,032 B1 * | 11/2014 | Weber | G06F 3/0483 715/764 |
| 2013/0268837 A1 * | 10/2013 | Braithwaite | G06F 16/958 715/234 |

(Continued)

*Primary Examiner* — K C Chen
(74) *Attorney, Agent, or Firm* — Weaver IP L.L.C.

(57) ABSTRACT

Methods and systems are provided for managing a GUI of a web browser. When a user interaction with a tab presentation control is detected, a horizontal tab strip having first navigation tab controls for a set of webpages is removed, and a vertical tab strip having second navigation tab controls for the same set of webpages is displayed in a vertical column in the browser. In response to detecting a user hover interaction with the vertical tab strip while the vertical tab strip is in a collapsed state, the vertical tab strip is expanded from the collapsed state to an expanded state. In response to termination of the user hover interaction, the vertical tab strip is collapsed from the expanded state to the collapsed state. The vertical tab strip in the collapsed state occupies a smaller portion of the GUI then the vertical tab strip in the expanded state.

20 Claims, 13 Drawing Sheets

(51) Int. Cl.
    *G06F 16/954*        (2019.01)
    *G06F 3/0485*        (2022.01)

(56) References Cited

U.S. PATENT DOCUMENTS

| 2014/0298239 A1* | 10/2014 | Jitkoff | G06F 3/0481 |
| | | | 715/777 |
| 2015/0199123 A1* | 7/2015 | Jitkoff | G06F 16/904 |
| | | | 715/781 |
| 2017/0193412 A1* | 7/2017 | Easton | G06Q 10/06313 |

\* cited by examiner

NAVIGATION TAB CONTROL ORGANIZATION AND MANAGEMENT FOR WEB BROWSERS

CROSS-REFERENCE TO RELATED APPLICATIONS

The present application is a continuation of U.S. patent application Ser. No. 17/028,737, now U.S. Pat. No. 11,531,719, entitled "NAVIGATION TAB CONTROL ORGANIZATION AND MANAGEMENT FOR WEB BROWSERS" and filed on Sep. 22, 2020, the entirety of which is incorporated by reference herein.

BACKGROUND

Today's widescreen laptops and high-end desktop monitors may be ideal for viewing video, but often, they pose challenging constraints for user interface developers and users. For example, the wider aspect ratios may limit valuable vertical space that is needed for displaying webpage content in a browser graphical user interface (GUI). Additionally, browser GUIs often include various information and/or controls across the top or bottom of the screen (e.g., a title bar, web address window, tool bar, webpage navigation tabs, etc.) that further reduce screen real estate in the vertical dimension and compete for space with the webpage content. At the same time, webpage content is often displayed in a somewhat narrow area in the center (e.g., horizontal center) of the browser GUI, leaving blank areas on either side of the webpage content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and systems are provided for managing a graphical user interface (GUI) of a web browser. The method comprises, in response to detecting a user interaction with a tab presentation selection control of the GUI, removing a horizontal tab strip from the GUI and displaying a vertical tab strip in the GUI. The horizontal tab strip comprises one or more first navigation tab controls arranged in a horizontal row, wherein each first navigation tab control enables access to a corresponding one of a set of webpages via the GUI. The vertical tab strip comprises one or more second navigation tab controls arranged in a vertical column, wherein each second navigation tab control enables access to a corresponding one of the set of webpages via the GUI. In response to detecting a first user hover interaction with the vertical tab strip while the vertical tab strip is in a collapsed state, the vertical tab strip is expanded from the collapsed state to an expanded state. In response to detecting a termination of the first user hover interaction, the vertical tab strip is collapsed from the expanded state to the collapsed state. The vertical tab strip in the collapsed state occupies a smaller portion of the GUI then the vertical tab strip in the expanded state.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
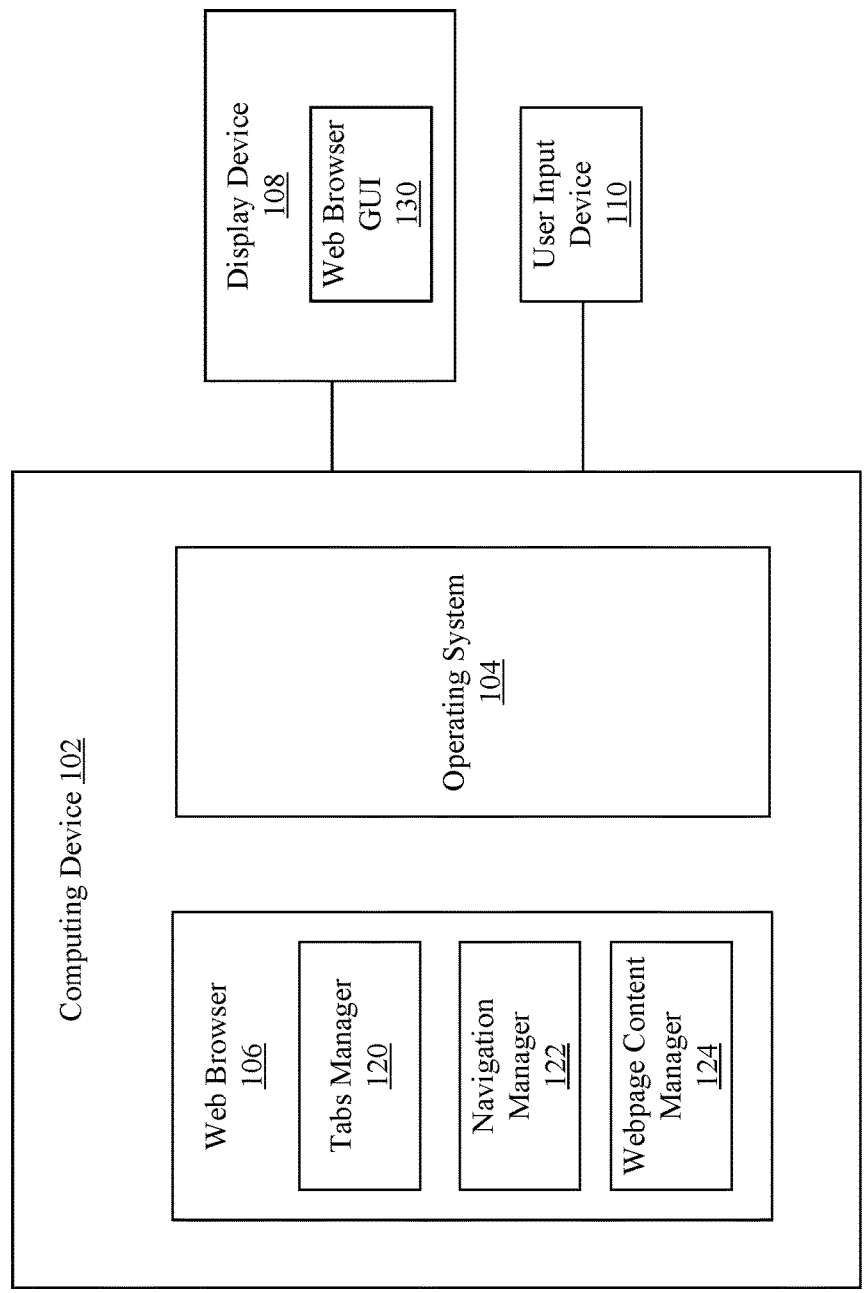
FIG. 1 is a block diagram of a system for organizing and managing navigation tab controls in a web browser graphical user interface (GUI), according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the disclosed embodiments. The scope of the embodiments is not limited only to the aspects disclosed herein. The disclosed embodiments merely exemplify the intended scope, and modified versions of the disclosed embodiments are also encompassed. Embodiments are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As noted above, browsers often display various information and/or controls across the top or bottom of a browser display screen (e.g., a title bar, web address window, tool bar, webpage navigation tabs, task bar, etc.). However, vertical space in a browser GUI can be limited, especially in screens with wide aspect ratios.

Some browsers display a strip or band of navigation tab controls (or tabs) in a horizontal row somewhere along the top portion of the GUI, above a window comprising webpage content. The navigation tab controls provide a quick navigation mechanism for displaying a desired webpage that may be open in the browser but its content may not be visibly displayed on the screen. Each navigation tab control may display some amount of information about its corresponding webpage (e.g., an icon representing the website or webpage, a title of the webpage, descriptive information, status information, search information, a webpage close control, etc.). However, as more and more webpages are opened in the browser, the increasing number of navigation tab controls become more crowded in the horizontal tab strip, and each tab becomes narrower, having less room to display the webpage information. For example, the navigation tab controls may become so narrow that only the icon and/or a close control is visible in the tab. This loss of webpage information may cause a user to become confused as to which tab represents which webpage, especially when multiple tabs represent different webpages from the same website and display the same icon. Also, as each navigation tab control becomes narrower, it provides a smaller area for user interaction, thus requiring users to be more precise when clicking on tabs and potentially leading to users accidentally clicking on the wrong tab.

A vertical tab strip (or vertical tab pane) provides significant benefits over a horizontal tab strip. Ample space in each navigation tab control can be used to display the corresponding webpage information and receive user clicks, even when many webpages are open in the browser. At the same time, precious vertical space in the browser GUI that was used for the horizontal tab strip may be freed-up and made available for webpage content, an address and/or tool bar, or other browser information. As the number of navigation tab controls in the vertical tab strip increases, the amount of space in each tab for displaying the webpage information may stay the same rather than being reduced, as in horizontal tab strips. This is because each tab can retain its height and width and the vertical tab strip may be configured to scroll up and down to show all of the tabs within the browser GUI display. In other words, a vertical tabs pane within the browser GUI may maintain its height and width, while the navigation tabs of the vertical tab strip are scrolled up and down through the pane. This allows the browser to conveniently display a seemingly endless number of navigation tabs in the vertical tab strip without sacrificing much screen real estate. This also allows users to easily see and manage their navigation tabs throughout the vertical tab strip.

However, while the benefits of vertical tabs are numerous, often the focus of the browser should be on webpage content. Therefore, to further increase the amount of screen area available for webpage content, embodiments described herein enable the vertical tab strip to be collapsed to just the narrow width of a single icon, such that instead of displaying the navigation tab controls in an expanded state showing all of the webpage information (e.g., the icon plus additional webpage information), each navigation tab control is reduced to its icon. This presentation of the vertical tab strip as a narrow strip of icons allows more of the width of the browser GUI to be allocated for webpage content.

In further accordance with embodiments described herein, to activate the expanded state of the vertical tab strip from the collapsed state, a quick mouse movement such as user hovering interaction over the collapsed tab strip may cause it to expand open over the top of a portion of the webpage content. This overlaying of the expanded vertical tab strip can be achieved without reflowing the webpage, while allowing users to see the full webpage information in the navigation tabs. Also, users may click on and navigate to a different webpage while they are hovering. If a user does not click on another webpage navigation tab control, once the user's mouse pointer leaves the expanded vertical tab strip (i.e., terminates the hover interaction), it may collapse again without reflowing the webpage content. Various time periods or timing thresholds may be configured for determining when to expand or collapse the vertical tabs strip while awaiting user input for a navigation tab control selection. The time periods may be configured to accommodate (1) users who want to navigate quickly without expansion of the vertical tabs strip, and (2) users who want the vertical tab strip to expand quickly to see the additional information in the navigation tabs. Moreover, while in the expanded state, the vertical tab strip may be pinned open to prevent it from collapsing again until unpinned.

These vertical tab strip display techniques provide for a more efficient use of browser GUI screen space as compared to conventional tab strip methods. For example, precious vertical space of the browser GUI may be freed-up for other uses. Moreover, horizontal space availability may be efficiently adjusted by automatically collapsing a vertical tab strip depending on dynamic behavior (or intentions) of a user (e.g. (1) a user quickly interacting with a navigation tab control or a partially opened navigation tab control to navigate to another webpage, (2) a user taking time to review additional webpage information shown in expanded navigation tabs).

Embodiments for organizing and managing navigation controls using vertical tab strips in a web browser GUI may be implemented in various ways. For example, FIG. 1 is a block diagram of a system 100 for organizing and managing navigation tab controls in a web browser graphical user interface (GUI), according to an example embodiment.

As shown in FIG. 1, system 100 includes a computing device 102, a display device 108, and a user input device 110. Computing device 102 includes a web browser 106 and an operating system 104. Web browser 106 includes a tabs manager 120, a navigation manager 122, and a webpage content manager 124. Display device 108 displays a web browser GUI 130.

Referring to FIG. 1, computing device 102 may comprise any suitable computing device, such as a stationary computing device (e.g., a desktop computer or personal computer), a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), a gaming console/system (e.g., Nintendo Switch®, etc.), an appliance, a set top box, etc.

Display device 108 is an output device for presenting information received from computing device 102. Display device 108 may comprise any suitable display technology such as liquid crystal (LCD), light-emitting diode (LED), organic light emitting-diode (OLED), plasma display panels (PDP), etc. Display device 108 may comprise an integrated display screen of computing device 102, a monitor, a projector, a headset (e.g., a virtual reality or augmented reality headset), or the like.

User input device 110 is configured to provide data and control signals to computing device 102 based on user gestures or manipulation of the device's controls. Examples of input device 110 include a mouse, keyboard, track pad, touch screen, eye tracker, scanner, digital camera, joystick, and microphone. A user may interact with a software application (e.g., web browser 106) via user input device 110 and GUI control elements. For example, a user may input a hover interaction, a selection interaction, or enter text at a location of a GUI control element of web browser GUI 130 via user input device 110. In some embodiments, multiple user input devices 110 may be utilized to convey the user's input to computing device 102 (e.g., a mouse and a keyboard).

Computing device 102 may be communicatively coupled to display device 108 and user input device 110 via any suitable communication technology (e.g., wireless, wired, optical, etc.). In some embodiments, computing device 102 is configured to communicate with display device 108 and/or user input device 110 via a network. In some embodiments, computing device 102 and one or both of display device 108 and user input device 110 may be integrated into a single device (e.g., in a laptop with a track pad and LCD display, or in a smart phone with a touch screen). In other embodiments, computing device 102 may be located remotely from one or both of display device 108 and user input device 110 (e.g., a laptop or desktop computer coupled to a separate monitor, mouse, keyboard, stylus, etc.).

Figure 13:
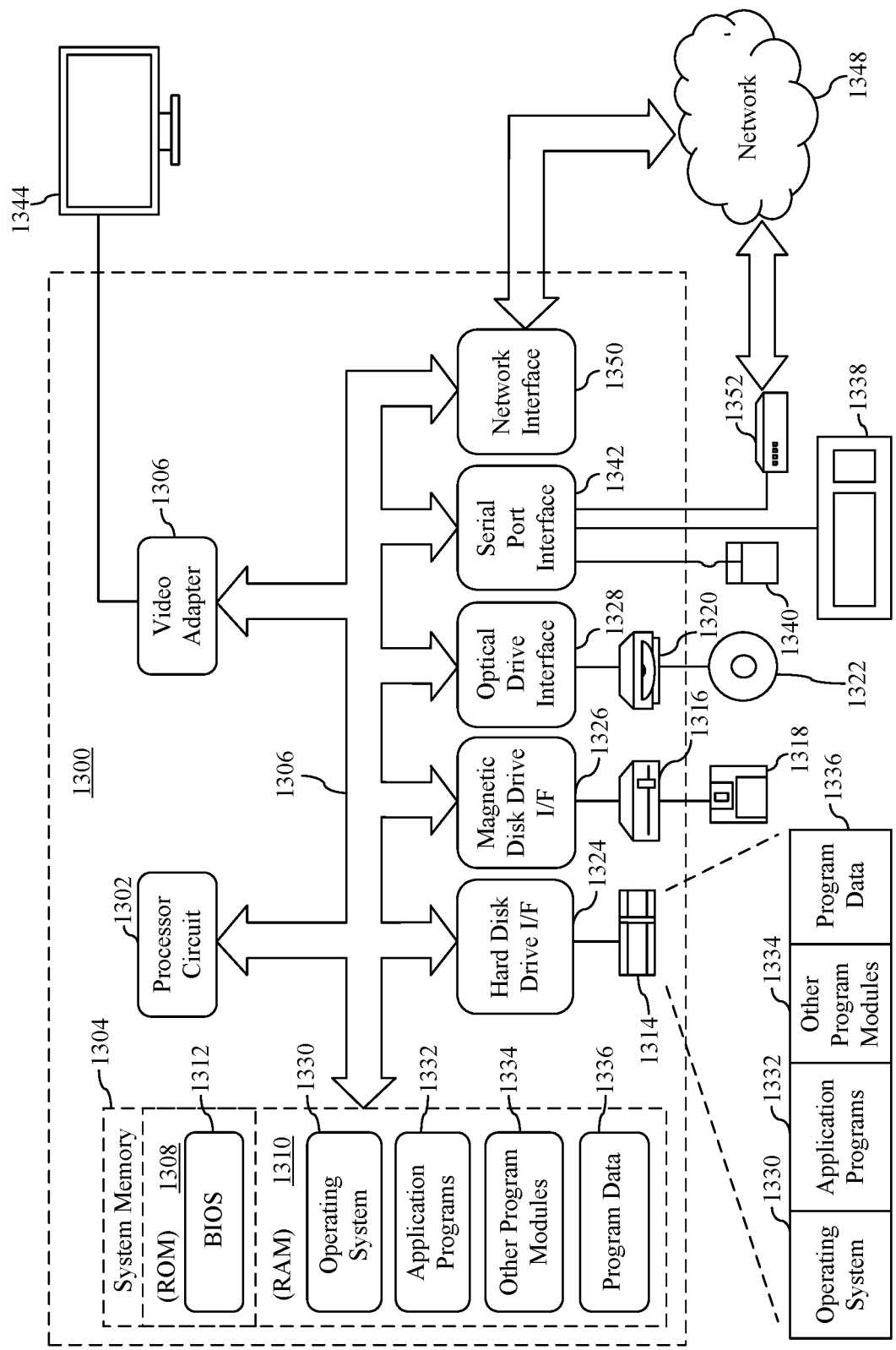
FIG. 13 is a block diagram of an example processor-based computer system that may be used to implement various embodiments.

Computing device 102 may comprise suitable logic, circuitry, and/or code configured to implement web browser 106 and operating system 104. FIG. 13 below describes one example implementation of computing device 102. Web browser 106 may comprise a software application configured to access websites via the Internet in response to user input via input device 110. Web browser 106 is configured to display webpages from the websites in web browser GUI 130 presented by display device 108. For example, when a user requests a webpage from a particular website using user input device 110, web browser 106 retrieves the corresponding content from a web server and displays the webpage content via display device 108 in web browser GUI 130.

Web browser GUI 130 may comprise displayed webpage content and various browser elements including interactive GUI controls (e.g., navigation tab controls, navigation icon controls, text input boxes, selection controls, anchor text, hovering zone controls, presentation selection controls, button controls, check boxes, etc.). The GUI controls may include graphic and/or text elements and allow a user to interact with underlying software via user input device 110 and operating system 104. The GUI controls of web browser GUI 130 may be organized in various bounded areas of a display, such as windows, panes, ribbons, bars, or strips (e.g., a tool bar, title bar, address bar, horizontal navigation tab strip, vertical navigation tab strip, side bar, vertical tabs pane, flyout pane, drawer extension, drop down box, tool tip, etc.).

Operating system 104 is configured to, among other things, track a pointer (e.g., a mouse pointer, cursor, etc.) that corresponds to user input at input device 110 and pixel locations in a web browser GUI 130 display (e.g., mouse movements, keyboard cursor controls, etc.). In various embodiments, where user input device 110 is a mouse (i.e., mouse 110), when mouse 110 is moved by a user, operating system 104 is configured to move the mouse pointer relative to pixels of display device 108. The mouse pointer comprises a target pixel that may be referred to as a "hot spot." Operating system 104 is configured to track the location of the "hot spot" as it changes position in a web browser GUI 130 display, and recognize its pixel position as the position of the mouse pointer. A user interaction (e.g., a click input, movement of the mouse, hovering the mouse, etc.) via mouse 110 in relation to controls of web browser GUI 130 may raise mouse events that are processed by operating system 104 and/or web browser 106. For example, operating system 104 is configured to transmit the mouse 110 pointer locations and mouse 110 user interaction events to web browser 106. Similarly, when another type of user input device 110 is utilized for inputting user interactions, operating system 104 may transmit pointer locations and events that result from user input at the other type of user input device 110 to web browser 106.

Web browser 106 may be configured to obtain, from operating system 104, the pointer locations and events raised as a result of user interactions via user input device 110 with controls of web browser GUI 130, and determine a response to the user interaction. Web browser 106 may be configured to analyze the user interaction with respect to a GUI control in the location of the pointer where the user interaction occurred, and determine how to change the display in web browser GUI 130, or to navigate to a different webpage and display its webpage content in browser GUI 130. For example, tabs manager 120 may detect a user interaction with a control for selecting a tab presentation style in web browser GUI 130, and may determine that a horizontal tab strip should be removed and the navigation tab controls from the horizontal tab strip should be displayed in a vertical tab strip along a side edge of the web browser GUI 130 display. In another example, tabs manager 120 may detect a user hover interaction in the location of a vertical tab strip in web browser GUI 130. Tabs manager 120 may determine that the vertical tab strip should expand to show more information about web pages that are open in web browser 130 based on the user hover interaction. In another example, tabs manager 120 may detect a user selection interaction in the location of a navigation tab control or a navigation icon control that indicates a particular webpage that is open in web browser 130. In response, tabs manager 120 may determine that webpage content corresponding with (i.e., associated with) the selected navigation tab control should be displayed in web browser GUI 130. In some embodiments, in response to a user selection interaction with a navigation tab control and/or icon control of web browser GUI 130, navigation manager 122 is configured to retrieve webpage content from a server via the Internet. Web page content manager 124 may be configured to display the retrieved webpage content in a window of web browser GUI 130.

Embodiments for organizing and managing navigation controls using vertical tab strips in a web browser GUI may be implemented in various ways. For example, FIG. 2 is a diagram of a web browser GUI display 200 with a horizontal tab strip and a tab presentation selection control, according to an example embodiment.

Figure 2:
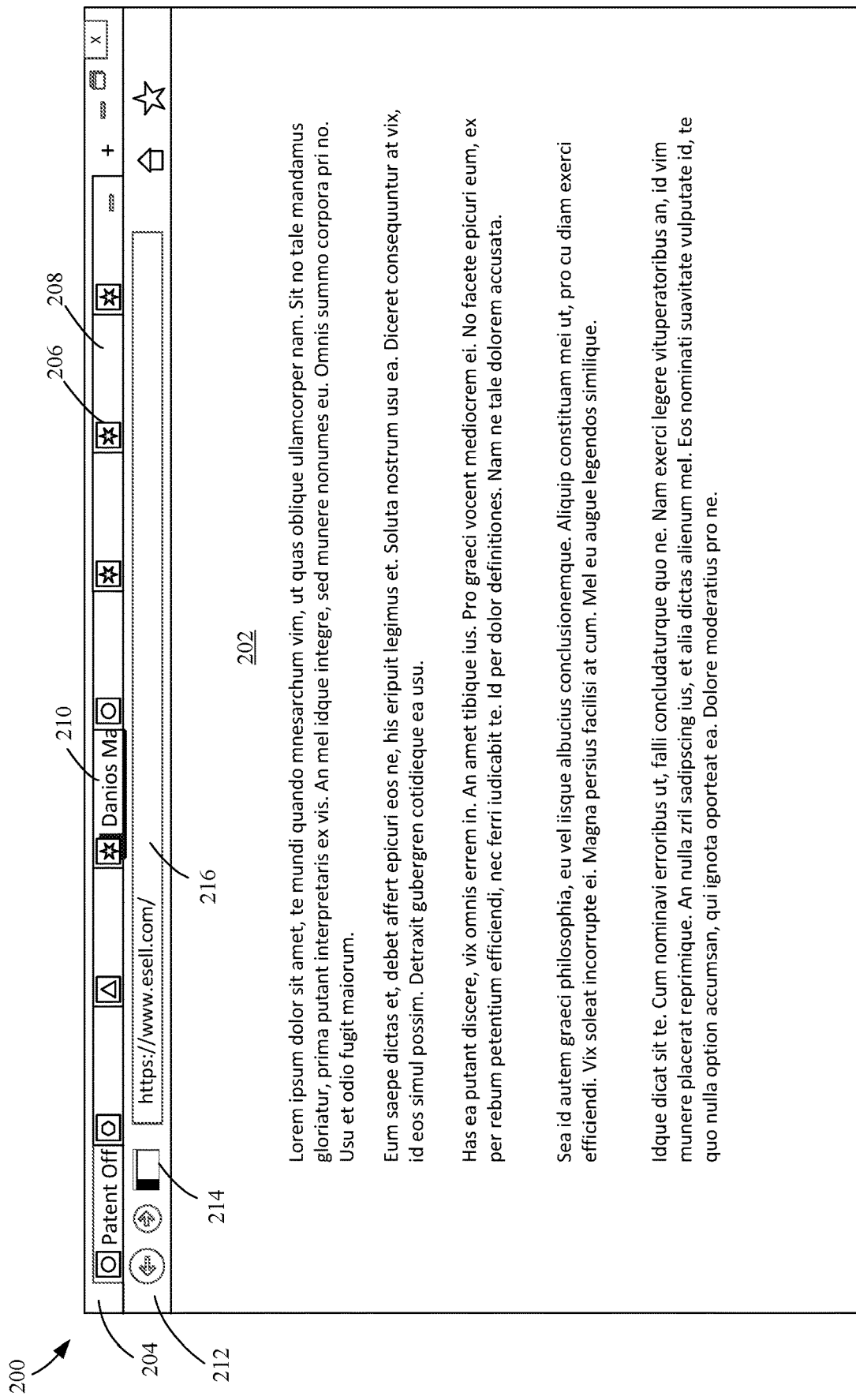
FIG. 2 is a diagram of web browser GUI display with a horizontal tab strip and a tab presentation selection control, according to an example embodiment.

As shown in FIG. 2, web browser GUI display 200 includes a display of web browser GUI 130 comprising a webpage content window 202, a horizontal tab strip 204, an icon 206, one or more navigation tab control(s) 208, a selected navigation tab control 210, a tool bar 212, a tab presentation selection control 214, and an address window 216.

Horizontal tab strip 204 includes one or more navigation tab controls 208 arranged in a horizontal row in web browser GUI 130. Each navigation tab control 208 corresponds to a webpage or website that is open in web browser 106. Each navigation tab control 208 may include an icon 206, text providing information about its corresponding (i.e., associated) webpage or website that is open in web browser 106, and/or a close webpage control (not shown). Icon 206 may be referred to as a favicon and may comprise a small "iconic" image that represents a corresponding website or webpage. The text of a navigation tab control 208 may provide additional information about its corresponding webpage or website. For example, the text may provide a title of a corresponding webpage, descriptive information about the webpage, status information, related search information, etc. One or more navigation tab control(s) 208 allow a user to have quick access to any of multiple webpages that are open at the same time, where open webpages may appear as a navigation tab control and/or a navigation icon control in the horizontal tab strip 204. In response to a user selection interaction (e.g., a click or tap) on a particular navigation tab control 208, web browser 106 is configured to display its corresponding webpage content in webpage content window 202 of web browser GUI 130. Selected navigation tab control 210 is shown as highlighted in horizontal tab strip 204 and indicates which webpage is currently displayed in webpage content window 202. In other words, webpage content window 202 comprises content corresponding to selected navigation tab control 210.

Tool bar 212 (i.e., a tool ribbon, tool band, tool strip, etc.) may comprise various controls, such as selection controls that enable a user to interact with software that is available and/or running in system 100. Tool bar 212 controls may include buttons, icons, menus, or other input or output elements. User interaction (e.g., via user input device 110) with a back arrow control in tool bar 212 may trigger navigation from a webpage content display "A" to the most recent webpage content display "B." Subsequent user interaction with a forward arrow control in tool bar 212 may reverse the direction of navigation back to webpage content display "A." User interaction with a "home" control in tool bar 212 may trigger navigation to a webpage configured in web browser 106 as a home webpage. User interaction with a "favorites" control in tool bar 212 may trigger opening of a drop down box comprising a list of controls for navigating to websites or webpages configured in web browser 106 as favorite websites.

Address window 216 may comprise a control area where user interaction with the control area may comprise typing or copying a webpage address (e.g., a uniform resource locator (URL)). A user "enter" interaction may trigger navigation to a webpage corresponding with the URL.

In some embodiments, tool bar 212 may comprise tab presentation selection control 214. Alternatively, or in addition, tab presentation control 214 may be located in another area of web browser GUI 130. While web browser 106 displays horizontal tab strip 204, in response to detecting a user interaction with tab presentation selection control 214, tabs manager 120 may change the presentation of the navigation tab strip from a horizontal presentation to a vertical presentation. For example, horizontal tab strip 204 comprising one or more navigation tab controls 208 that each correspond respectively to one or more webpages, may be removed from web browser GUI 130, and a vertical tab strip comprising one or more navigation tab controls arranged in a vertical column may be displayed in web browser GUI 130. As described in more detail below, each of the one or more navigation tab controls of the vertical tab strip correspond respectively to the same one or more webpages. In other words, user interaction with tab presentation control 214 via user input device 110, may trigger tabs manager 120 to reorient horizontal tab strip 204 comprising one or more tab controls 208 from a horizontal row to a vertical column in web browser GUI 130 having one or more navigation tab controls corresponding respectively to the same webpages as navigation tab controls 208.

As described above, horizontal tab strip 204 includes one or more navigation tab controls 208 that may each include an icon, text providing information about its corresponding webpage, and/or a webpage close control. However, as an increasing number of webpages are opened in web browser 106, the navigation tab controls 208 may become increasingly crowded in horizontal tab strip 204 and the amount of information that may be presented in each navigation tab control 208 may decrease. For example, each navigation tab control 208 may become so narrow that there is only room for displaying an icon 206 and/or a webpage close control in the navigation tab control 208. In such a state, users may have difficulty knowing which webpages correspond to which navigation tab controls 208.

Navigation controls displayed in a vertical tab strip (e.g., as described with respect to FIGS. 3-7) as opposed to a horizontal tab strip, may enable a more efficient use of web browser GUI 130 screen space. A vertical tab strip may be displayed in an expanded state or a collapsed state and may be animated between those between those two states. A vertical tab strip displayed in the collapsed state may represent navigation tab controls as only an icon (i.e., a navigation icon control), or an icon and a close webpage control. Navigation tab controls of a vertical tab strip displayed in the expanded state may comprise ample screen space for displaying information (e.g., text) about a corresponding (i.e., associated) webpage along with a corresponding icon. Switching from a horizontally oriented tab strip to a vertical tab strip may also free-up valuable vertical screen space in the web browser GUI 130 for expanding webpage content window 202 vertically or displaying other GUI elements such as a webpage title bar. At the same time, the vertical tab strip presentation may make use of unused or blank side areas of webpage content window 202 in web browser GUI 130.

Embodiments for organizing and managing navigation controls using vertical tab strips in a web browser GUI may be implemented in various ways. For example, FIG. 3 is a diagram of a web browser GUI display 300 with a vertical tab strip in a collapsed state and a tab presentation selection control, according to an example embodiment.

Figure 3:
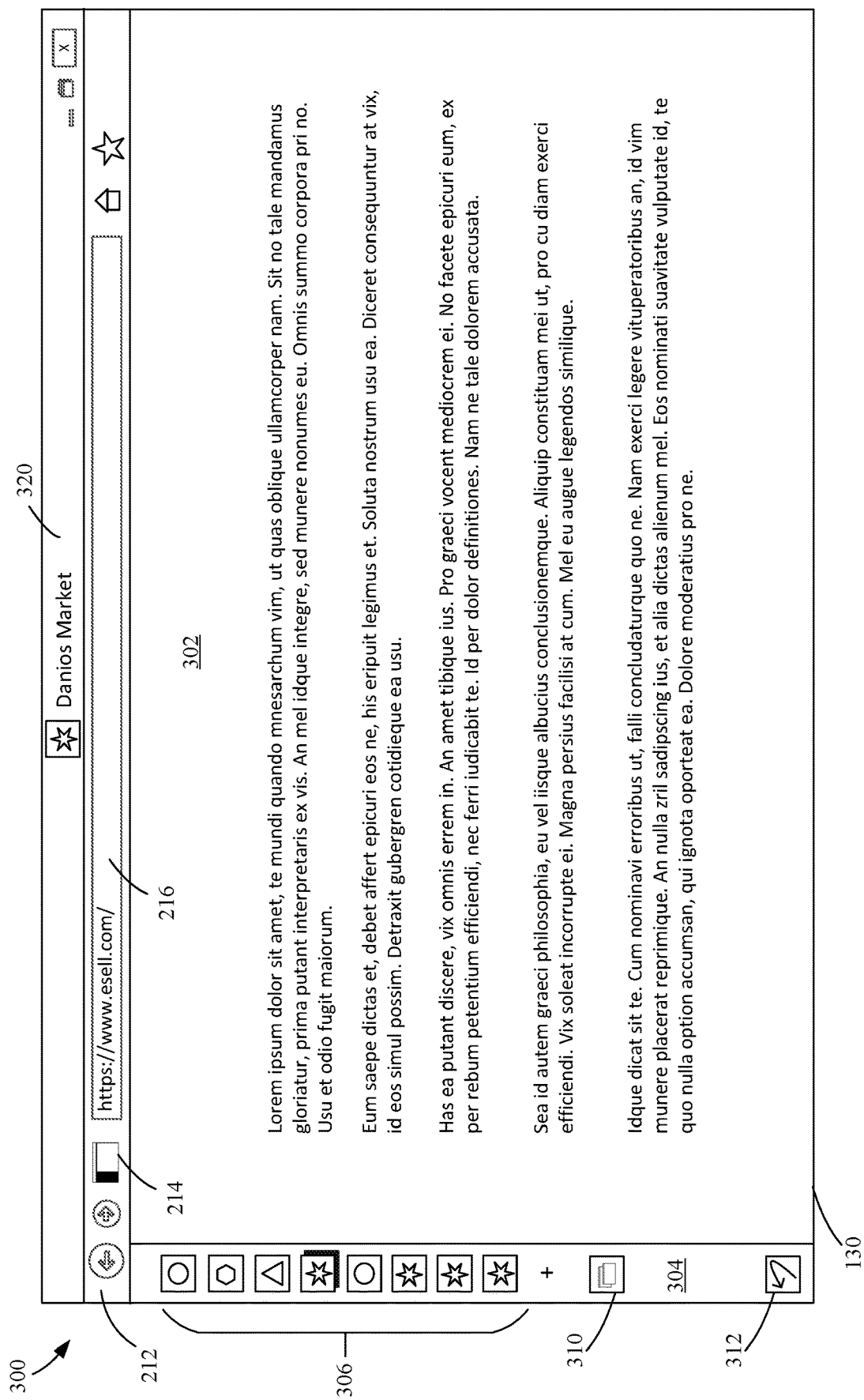
FIG. 3 is a diagram of a web browser GUI display with a vertical tab strip in a collapsed state and a tab presentation selection control, according to an example embodiment.

As shown in FIG. 3, web browser GUI display 300 includes a display of web browser GUI 130 comprising tool bar 212, tab presentation selection control 214, address window 216, a webpage content window 302, a vertical tab strip 304, one or more navigation tab controls 306, an open last session tab control 310, an undo closed tab control 312, and a title bar 320.

Referring to FIGS. 2-3, the horizontal tab strip 204 of webpage GUI 130 has been removed and replaced with vertical tab strip 304, which also may be referred to as vertical icon strip 304 or vertical favicon strip 304. One or more navigation tab controls 306 of vertical tab strip 304 provide access to all of the same webpages that were accessible in horizontal tab strip 204. For example, each of the one or more webpages open in web browser GUI 130 that were accessible by user interaction with one or more navigation tab controls 208 of web browser GUI display 200, are accessible via one or more respective navigation tab controls 306 in web browser GUI display 300.

Navigation tab controls 306 include a selected tab control (e.g., highlighted in FIG. 3) that corresponds to selected navigation tab 210 shown in web browser GUI display 200. The selected tab control of navigation tab controls 306 indicates which webpage content is displayed in webpage content window 302.

In some embodiments, title bar 320 may be displayed in a location where horizontal tab strip 204 was previously located or in another position of web browser GUI 130 made available by removing horizontal tab strip 204. Title bar 320 may comprise a title of the webpage content displayed in webpage content window 302. In using screen space freed-up by converting from horizontal tab strip 204 to vertical tab strip 306, title bar 320 may provide ample room to display the full title of the webpage content displayed in webpage content window 302. In some embodiments, title bar 320 may be collapsed or hidden so that screen space utilized by title bar 320 may be made available for other uses. For example, a user selectable collapse title bar control may be displayed inside a context menu (not shown) that may be opened in response to a user selection interaction (e.g., a user may open the context menu by right-clicking within title bar 320 and then may select a control labeled "collapse/hide title bar"). Tabs manager 120 may be configured to detect the user selection interaction, and in response, collapse title bar 320. As described in more detail below, other types of controls may be utilized to expand or collapse title bar 320.

In some embodiments, vertical tab strip 304 may include open last session control 310. In response to detecting a user selection interaction with open last session control 310 via user input device 110, navigation manager 120 may retrieve webpage content (e.g., from a webpage server via the Internet) that was displayed in an earlier session of web browser 106, which was previously closed. Webpage content manager 124 may be configured to display the retrieved webpage content in web content window 302. In this manner, a user may quickly access a set of webpages that may have been closed when computing device 102 was powered off or a web browser 106 session was previously closed.

In some embodiments, vertical tab strip 304 may include undo closed tab control 312. In response to detecting a user selection interaction with undo closed tab control 312 via user input device 110, navigation manager 122 may retrieve (e.g., from a webpage server via the Internet) a webpage that was earlier dismissed or closed in a current session of web browser GUI 130.

In FIG. 3, vertical tab strip 304 is shown in a collapsed state. When vertical tab strip 304 is in a collapsed state (vs. an expanded state) the vertical tab strip covers less screen area. For example, tabs manager 120 may be configured to display one or more navigation tab controls 306 within vertical tab strip 304, while in the collapsed state, as only icons, or in some embodiments, as an icon and a close webpage control. Thus, more screen space may be allocated for displaying webpage content window 302. In this manner, the webpage content may be enlarged and/or displayed to include a larger portion of the webpage content within webpage content window 302.

Tabs manager 120 may be configured to convert or animate vertical tab strip 304 from the collapsed state to an expanded state in response to a user hover interaction with vertical tab strip 304. A user may invoke a hover interaction by controlling user input device 110 to move a pointer (e.g., mouse pointer, cursor, etc.) within a screen area allocated to vertical tab strip 304. As described in more detail below, various time periods (or timing thresholds) may be configured in memory (described with respect to FIG. 13) of computing device 102 to manage expanding and collapsing the vertical tab strip in response to user input.

Embodiments for organizing and managing navigation controls using vertical tab strips in a web browser GUI may be implemented in various ways. For example, FIG. 4 is a diagram of a web browser GUI display 400 with a vertical tab strip in a hovering expanded state, which may include an open last session control and an undo closed tab control, according to an example embodiment.

Figure 4:
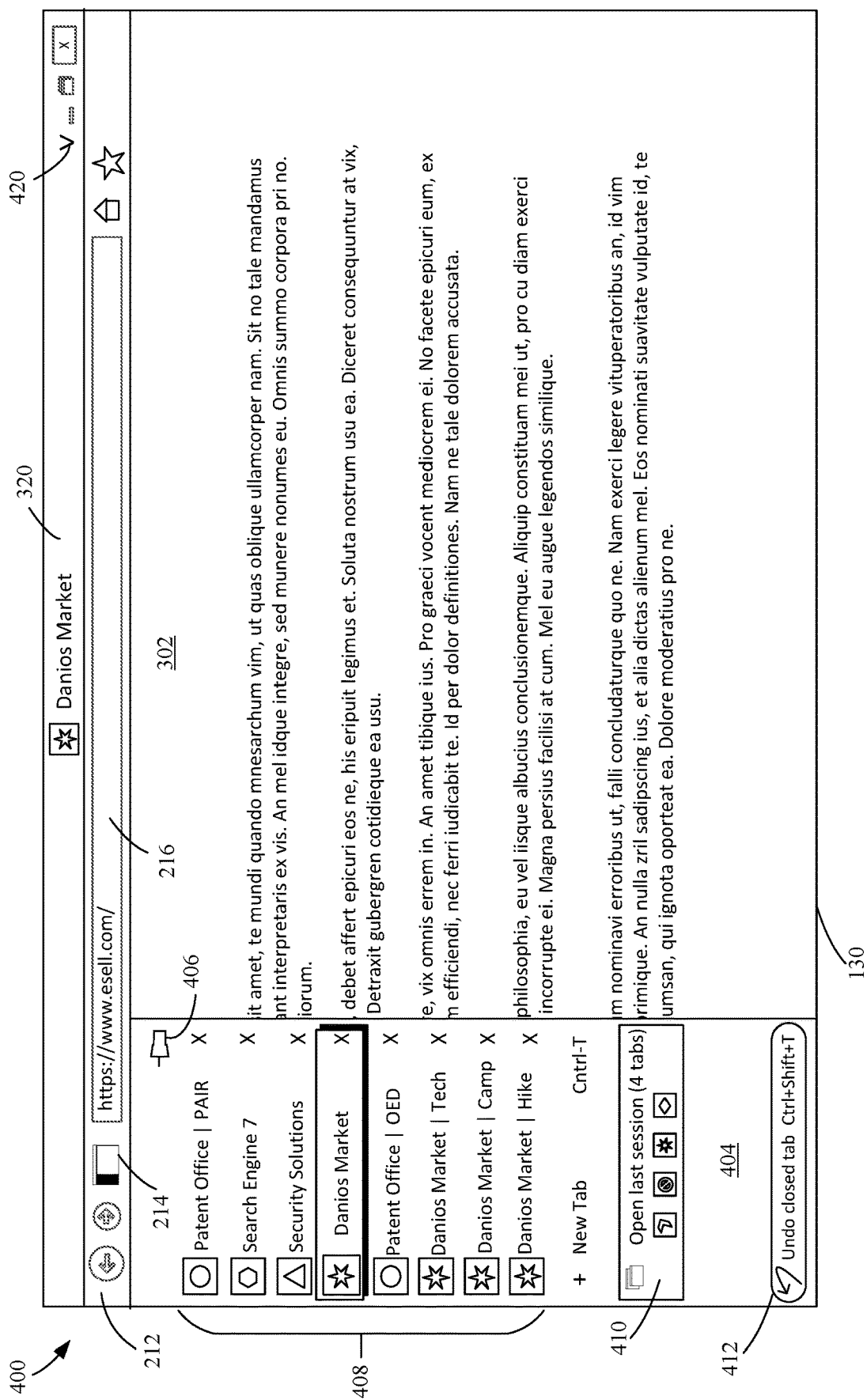
FIG. 4 is a diagram of a web browser GUI display with a vertical tab strip in a hovering expanded state, which may include an open last session control and an undo closed tab control, according to an example embodiment.

As shown in FIG. 4, web browser GUI display 400 includes a display of web browser GUI 130 comprising webpage content window 302, tool bar 212, tab presentation selection control 214, address window 216, title bar 320, a vertical tab strip 404, a pinning control 406, one or more navigation tab controls 408, an open last session tab control 410, an undo closed tab control 412, and a collapse title bar control 420.

As mentioned above, tabs manager 120 may be configured to convert or animate vertical tab strip 304 to an expanded state as vertical tab strip 404, in response to a user hover interaction with vertical tab strip 304. During the user hover interaction, expanded vertical tab strip 404 may overlay or hover over webpage content window 302 and may cover a portion of webpage content within the window. For example, when user input device 110 is a mouse and vertical tab strip 304 is in the collapsed state (as shown in FIG. 3), a user may move the mouse pointer into the area of vertical tab strip 304, and tabs manager 120 may be configured to open or animate open the vertical tab strip to the expanded state in response to the user hover interaction. As long as the mouse pointer continues to hover somewhere within the expanding or expanded vertical tab strip 404 area (e.g., in a vertical pane), the expanded state of the vertical tab strip may persist. When the mouse pointer is removed from vertical tab strip 404 area, the hovering interaction terminates, and tabs manager 120 is configured to collapse (e.g., animate or close) the vertical tab strip to the collapsed state as shown in FIG. 3 (as vertical tab strip 304). In some embodiments, web browser 106 may not reflow webpage content window 302 while detecting the user hover interaction, or when transitioning from the collapsed state to expanded state, or from the expanded state to the collapsed state. Instead, as shown in FIG. 4, vertical tab strip 404 may overlay (or hover over) a portion of webpage content window 302. In this manner, users may continue to utilize web browser GUI 130 during the expanding and collapsing transitions without the visual disruption caused by a webpage reflow action. Although vertical tab strip 404 and vertical tab strip 304 are shown on the left side of webpage content window 302 and below address bar 212, tabs manager 120 may be configured to display the vertical tab strips in any suitable position or with any suitable dimension within web browser GUI 130. For example, vertical tab strip 404 and/or vertical tab strip 304 may extend, in a vertical dimension, from the bottom to the top of web browser GUI 130 rather than from the bottom of web browser GUI 130 to the bottom of address bar 212, as shown in FIGS. 3 and 4.

Moreover, tabs manager 120 may be configured to detect a user selection interaction (e.g., a mouse click) with a navigation tab control of the vertical tab strip in the collapsed state, the expanded state, or during an animation between the collapsed and expanded states, and may display a webpage corresponding to (i.e., associated with) the selected navigation tab control in webpage content window 302. Depending on the timing of the user's selection interaction, tabs manager 120 may be configured to (1) maintain the vertical tab strip in the collapsed state, or return it to the collapsed state after detecting the user selection interaction with a navigation tab control of the vertical tab strip, or (2) display the vertical tab strip in the expanded state after the user selection interaction with the navigation tab control. As described in more detail below, navigation manager 120 may be configured to respond to the user selection interaction with the navigation tab control in such a way as to accommodate conflicting user intents (e.g., one user's intent to quickly navigate to one or more new webpages without expanding the vertical tab strip vs another user's intent to expand the descriptive tab strip quickly to see additional webpage information in the navigation tab controls).

While vertical tab strip 404 is in the expanded state, tabs manager 120 may be configured to display pinning control 406 (e.g., within vertical tab strip 404). In response to detecting a user selection interaction with pinning control 406, tabs manager 120 may be configured to pin the vertical tab strip in a pinned expanded state. In some embodiments, in response to the user pinning interaction with pinning control 406, tabs manager 120 may be configured to reflow and resize webpage content window 302 to display the full webpage content window in a reduced screen area along with the vertical tab strip in the pinned expanded state (see FIG. 5A). While the vertical tab strip is in a pinned expanded state, tabs manager 120 may not detect a user hover interaction or removal of the hover interaction such that the vertical tab strip persists in the pinned expanded state until it is unpinned or collapsed in response to a user input interaction with an unpin or collapse control (see FIG. 5A). In some embodiments, the pinned expanded state may persist after web browser 106 is closed and opened at a later time. Moreover, tabs manager 120 may be configured to open the tab strip in either of the collapsed state or the expanded state as a default state, when opening a new web browser 106 session.

The one or more navigation tab controls 408 displayed in vertical tab strip 404 may provide the same navigation functionality as the one or more navigation tab controls 306 of vertical tab strip 304. In other words, navigation tab controls 408 may provide access to all of the same webpages that are accessible via respective navigation tab controls 306.

Navigation tab controls 408 include a selected tab control (e.g., highlighted in FIG. 4) that indicates which webpage content is displayed in webpage content window 302. The selected tab control corresponds to selected navigation tab 210 and the highlighted navigation tab control of vertical tab strip 304

Open last session tab control 410 may function substantially the same as open last session tab control 310. However, open last session tab control 410 may occupy a larger screen area in web browser GUI 130 and may display additional information about webpages that were open before the previous session was closed. For example, open last session control 410 may display one or more icons and/or descriptive text about the previously open webpages.

Undo closed tab control 412 may function substantially the same as undo closed tab control 312. However, undo closed tab control 412 may display additional information about the undo closed tab function, such as how to re-open a closed tab using a user interaction via a keyboard user input device 110.

Tabs manager 120 may be configured to detect a scrolling user interaction received via user input device 110 and operating system 104 with respect to vertical tab strip 304 and/or vertical tab strip 404. For example, a user may control user input device 110 to scroll navigation tab controls 306 when the vertical tab strip is in the collapsed state or scroll navigation tab controls 408 when the vertical tab strip is in the expanded state. In this regard, the navigation icon or expanded tab controls move upward or downward, within or through the vertical tab strip. In some embodiments, many webpages (e.g., 10, 100, etc.) may be open in web browser 106 such that there are so many corresponding navigation tab controls 306 or navigation tab controls 408, that they do not fit within the vertical length of a vertical tab strip in web browser GUI 130. In some embodiments, while some of the navigation tab controls may be configured to scroll, others may be configured to remain stationary. For example, open last session tab control 410 and undo closed tab control 412 may remain stationary while navigation tab controls 408 may scroll through vertical tab strip 404.

Moreover, tabs manager 120 may be configured to detect a user selection interaction with collapse title bar control 420, and in response, may hide (e.g., remove or collapse) title bar 320. As described below, hiding title bar 320 may free-up vertical screen space for other uses and thereby provide a more efficient use of GUI screen space.

Embodiments for organizing and managing navigation controls using vertical tab strips in a web browser GUI may be implemented in various ways. For example, FIG. 5A is a diagram of a web browser GUI display 500 with a vertical tab strip in a pinned expanded state and a hidden title bar, according to an example embodiment.

Figure 5A:
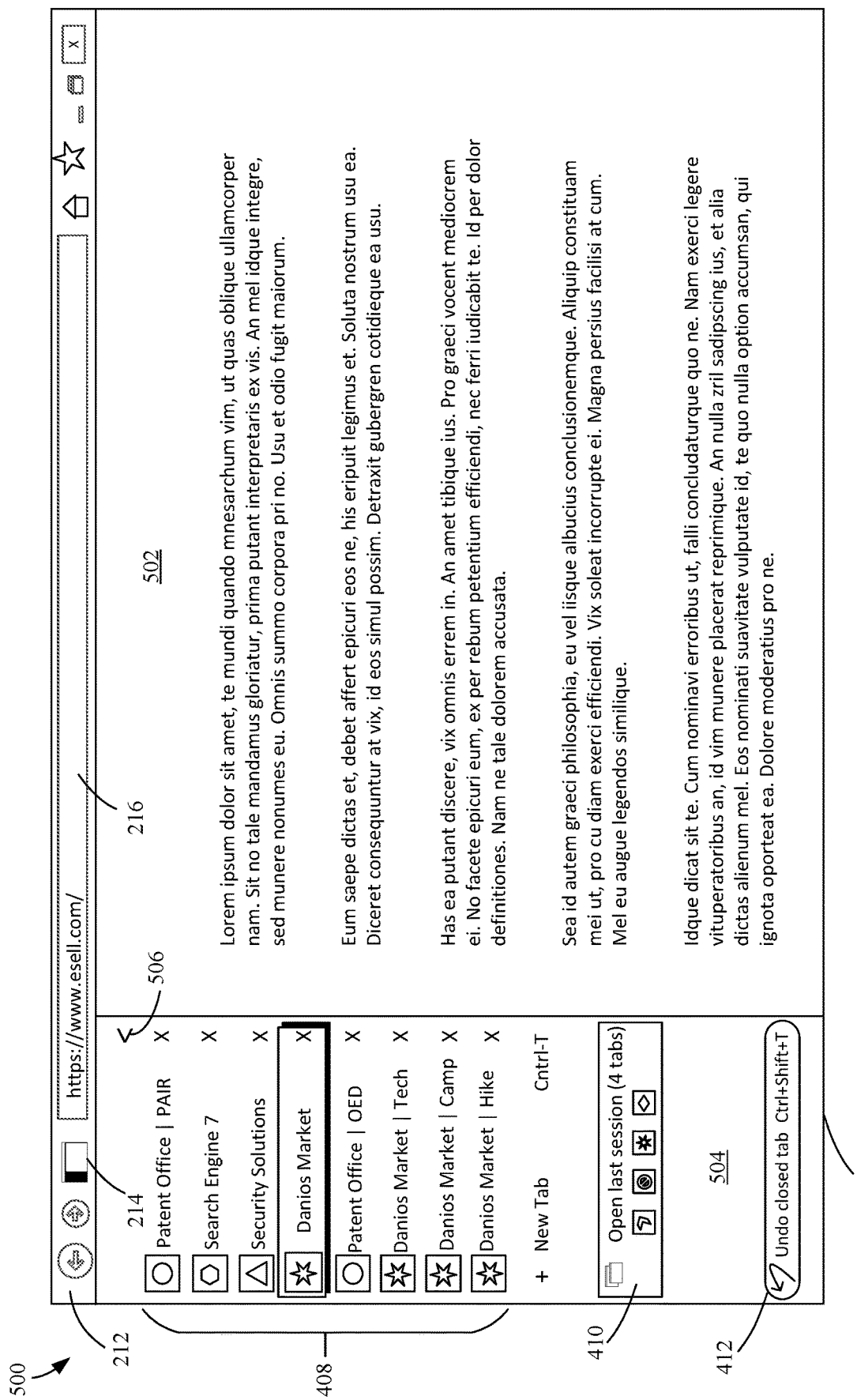
FIG. 5A is a diagram of a web browser GUI display with a vertical tab strip in a pinned expanded state and a collapsed title bar, according to an example embodiment.

As shown in FIG. 5A, web browser GUI display 500 comprises a display of web browser GUI 130 that includes webpage content window 502, tool bar 212, tab presentation selection control 214, address window 216, a vertical tab strip 504, an unpin control 506, one or more navigation tab controls 408, open last session tab control 410, and undo closed tab control 412.

Vertical tab strip 504 is pinned in an expanded state in FIG. 5A, and includes unpin control 506. As described above, as a result of a user pinning interaction with pinning control 406, tabs manager 120 is configured to reflow web browser GUI 130, resize webpage content window 302, and fit webpage content within a reduced screen area of webpage content window 502. As shown in FIG. 5A, vertical tab strip 504 no longer overlays a webpage content window, and instead, is positioned adjacent to webpage content window 502.

As a result of a user interaction with unpin control 506, tabs manager 120 is configured to transition pinned vertical tab strip 504 to the state of unpinned vertical tab strip 404, and may reflow web browser GUI 130 to convert webpage content window 502 to webpage content window 302, which may be overlaid by vertical tab strip 404 comprising pinning control 406.

Embodiments for organizing and managing navigation controls using vertical tab strips in a web browser GUI may be implemented in various ways. For example, FIG. 5B is a diagram of a web browser GUI display 550 with a vertical tab strip in a collapsed state, which may include an open last session control, an undo closed tab control, and a hidden title bar, according to an example embodiment.

Figure 5B:
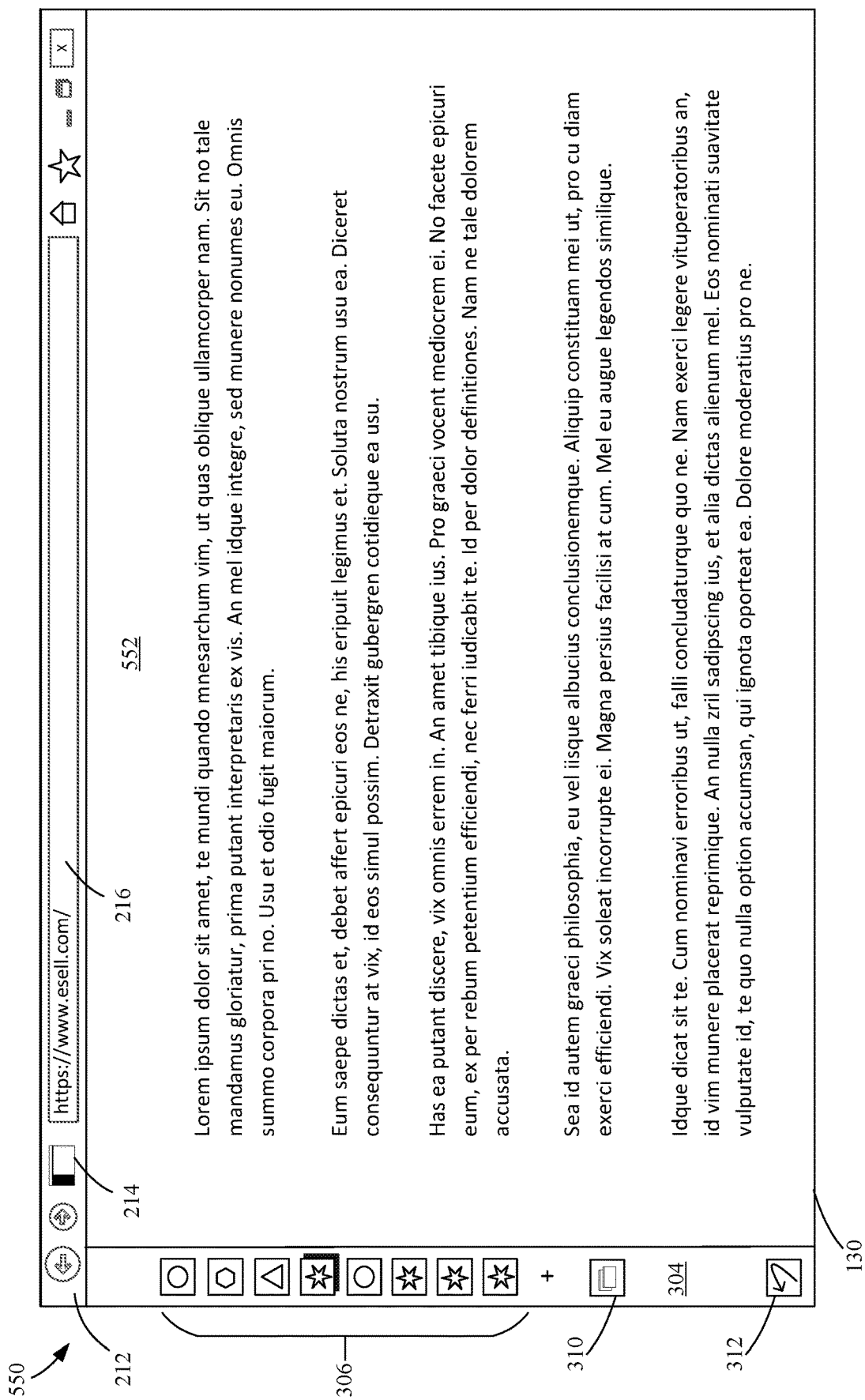
FIG. 5B is a diagram of a web browser GUI display with a vertical tab strip in a collapsed state, which may include an open last session control, an undo closed tab control, and a hidden title bar, according to an example embodiment.

As shown in FIG. 5B, web browser GUI display 550 includes a display of web browser GUI 130 comprising tool bar 212, tab presentation selection control 214, address window 216, vertical tab strip 304, one or more navigation tab controls 306, open last session tab control 310, undo closed tab control 312, and a webpage content window 552.

Referring to FIG. 5B, web browser GUI display 550 does not include a title bar. Whereas web browser GUI displays 300 and 400 include title bar 320, web browser GUI displays 500 and 550 do not include the title bar. By eliminating or hiding the title bar, vertical screen space is freed-up for other uses. For example, web browser 106 may be configured to allocate additional vertical screen space to webpage content window 502, as in webpage content window 552, to increase the vertical dimension of the web page content window when the title bar and the horizontal tab strip are not displayed. As such, webpage content may be enlarged in a vertical direction, or additional webpage content may be fit vertically to the larger webpage content window. In this manner, screen space utilization is improved in the vertical direction to provide a more readable or more informative webpage content display.

Furthermore, as shown in web browser GUI display 550 of FIG. 5B, the title bar is removed or hidden, and concurrently, vertical tab strip 304 is displayed in a collapsed state. By eliminating the title bar and displaying vertical tab strip 304 in a collapsed state, vertical and horizontal screen space is freed-up for another use. For example, web browser 106 may be configured to allocate additional vertical screen space and additional horizontal screen space to webpage content window 552 to increase the vertical and horizontal dimensions of webpage content window 552 relative to webpage content windows 202, 302, and 502. As such, webpage content may be enlarged in vertical and/or horizontal directions, and/or additional webpage content may be fit vertically and/or horizontally to the larger webpage content window 552. In this manner, screen space utilization is improved vertically and/or horizontally to provide a more readable or more informative webpage content display.

Embodiments for organizing and managing navigation controls using vertical tab strips in a web browser GUI may be implemented in various ways. For example, FIG. 6 is a diagram of a web browser GUI display 600 with a vertical tab strip in a hovering expanded state where navigation tab controls are organized in groups, according to an example embodiment.

Figure 6:
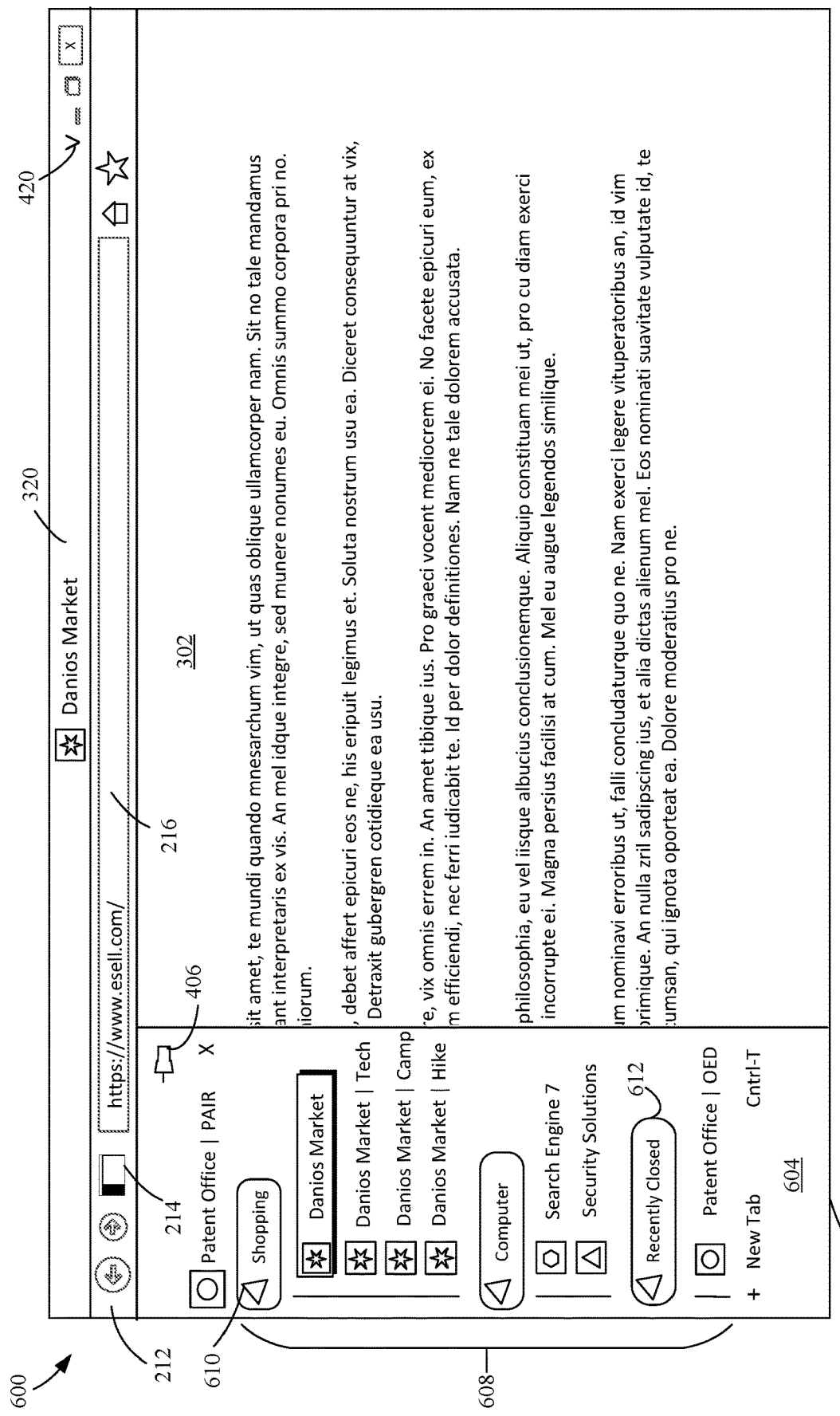
FIG. 6 is a diagram of a web browser GUI display 600 with a vertical tab strip in a hovering expanded state where navigation tab controls are organized in groups, according to an example embodiment.

As shown in FIG. 6, web browser GUI display 600 includes a display of web browser GUI 130 comprising webpage content window 302, tool bar 212, tab presentation selection control 214, address window 216, title bar 320, pinning control 406, collapse title bar control 420, a vertical tab strip 604, one or more expanded groups of navigation tab controls 608, and a collapse tab group control 610. One or more expanded groups of navigation tab controls 608 may include a recently closed tab group 612.

Tabs manager 120 may be configured to organize navigation tab controls (e.g., navigation tab controls 306 or 408) according to groups and display each of the groups in a collapsed state or an expanded state within a vertical tab strip, such as expanded vertical tab strip 604. The navigation tab controls of vertical tab strip 604 may be grouped in various ways. For example, the navigation tab controls may be grouped according to webpage categories or topics (e.g., shopping, work, types of companies, schools, government, types of software applications, etc.). In another example, the navigation tab controls may be grouped by which website hosts the open webpages, where all of the open webpages of a particular website (or navigation icon control) are grouped together.

Referring to FIG. 6, expanded tab strip 604 includes one or more expanded groups of navigation tab controls 608 (e.g., each group is displayed in an expanded state). The navigation tab controls of each of the expanded groups are displayed in a collapsible list under a group name tab. The group name tab may indicate the name of the respective group (e.g., shopping, computer, etc.). Each group's name tab includes a collapse tab group control 610. In response to a user interaction with a particular collapse tab group control 610, tabs manager 120 is configured to hide the navigation tab controls listed under the corresponding group name tab comprising the particular collapse tab control 610. By collapsing the list of navigation tab controls within a group, more groups may be displayed in vertical tab strip 604.

Recently closed tab group 612 comprises one or more navigation tab controls for opening one or more corresponding webpages that were closed during a current session of web browser 106. As shown in FIG. 6, recently closed tab group 612 is displayed in an expanded state. In response to receiving a user selection interaction with a particular navigation tab control listed in the recently closed tab group 612, navigation manager 122 is configured to retrieve a webpage corresponding to the particular navigation tab control, and webpage content manager 124 is configured to display the retrieved webpage in webpage content window 302.

Embodiments for organizing and managing navigation controls using vertical tab strips in a web browser GUI may be implemented in various ways. For example, FIG. 7 is a diagram of a web browser GUI display with a vertical tab strip in a hovering expanded state where navigation tab controls are organized in groups with some groups in an expanded state and some groups in a collapsed state, according to an example embodiment.

Figure 7:
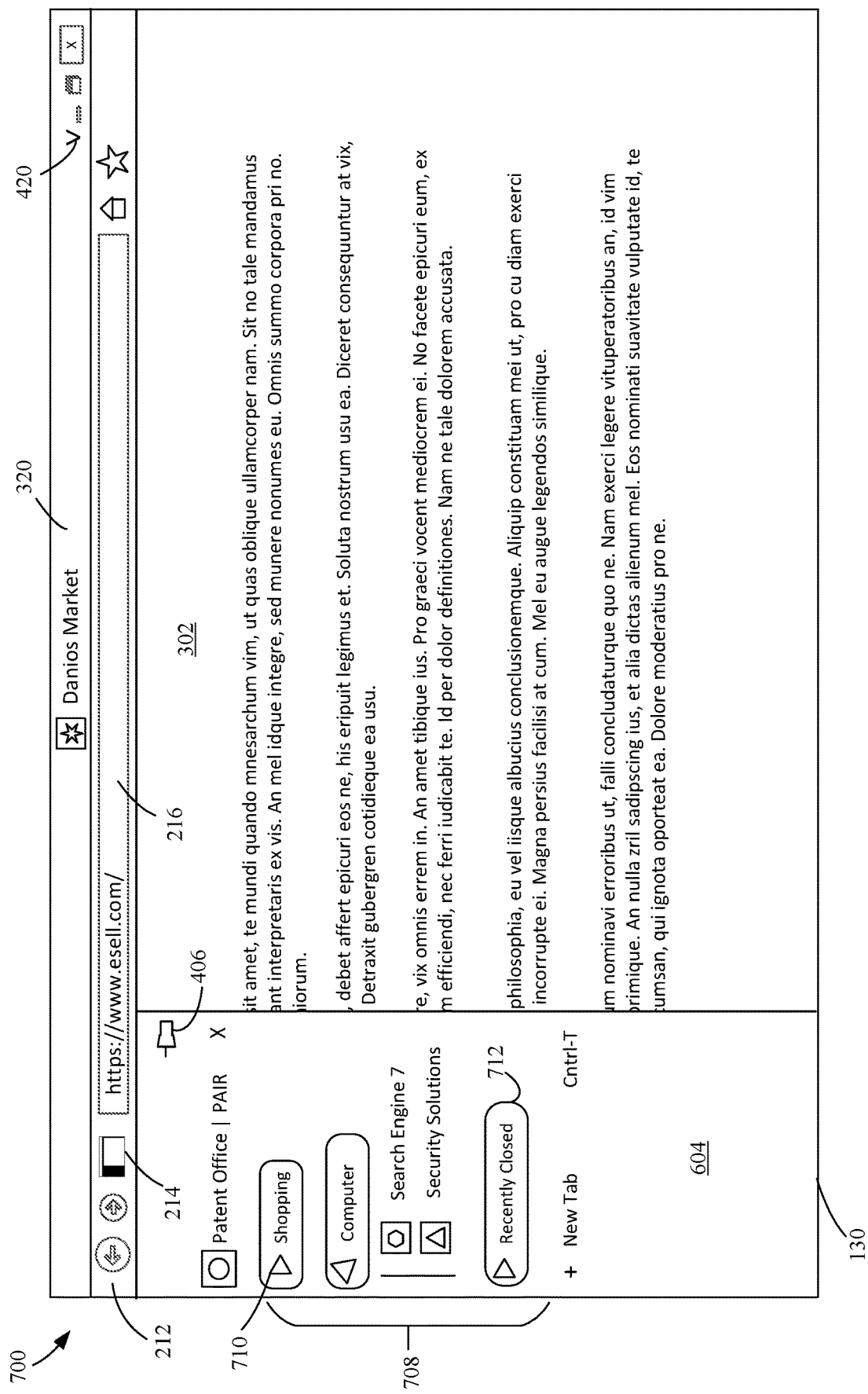
FIG. 7 is a diagram of a web browser GUI display with a vertical tab strip in a hovering expanded state where navigation tab controls are organized in groups with some groups in an expanded state and some groups in a collapsed state, according to an example embodiment.

As shown in FIG. 7, web browser GUI display 700 includes a display of web browser GUI 130 comprising webpage content window 302, tool bar 212, tab presentation selection control 214, address window 216, title bar 320, pinning control 406, collapse title bar control 420, vertical tab strip 604, expanded and collapsed groups of navigation tab controls 708, and an expand tab group control 710. Expanded and collapsed groups of navigation tab controls 708 includes a collapsed recently closed tab group 712.

Referring to FIG. 7 one or more groups of navigation tab controls of tab strip 604 may be collapsed and listed in expanded and collapsed groups of navigation tab controls 708. A group name tab of a collapsed group may indicate the name of the respective group (e.g., shopping, recently closed, etc.) and may include an expand tab group control 710. In response to a user interaction with a particular expand tab group control 710, tabs manager 120 is configured to display one or more individual navigation tab controls under the corresponding group name tab (as shown in FIG. 6). By expanding the list of navigation tab controls within a group of tab controls, a user may select a navigation tab control for displaying corresponding webpage content in webpage content window 302.

Collapsed recently closed tab group 712 is shown in the collapsed state and may be expanded using a corresponding expand tab group control. In response to detecting a user selection interaction with an expand tab group control of the recently closed tab group 712, tabs manager 120 may expand the recently closed tab group and list one or more navigation tab controls belonging to the recently closed tab group as shown in FIG. 6.

Although expanded groups of navigation tab controls 608 and expanded and collapsed groups of navigation tab controls 708 are shown in vertical tab strip 604, which is displayed in an expanded state where navigation control tabs comprise icons and additional information, navigation icon controls may be displayed in groups in a collapsed vertical tab strip. The grouped navigation icon controls may also be displayed as expanded or collapsed groups.

Moreover, although one or more recently closed navigation tab controls are shown as belonging to a group in FIGS. 6 and 7, one or more recently closed navigation tab controls may be displayed in various ways. For example, the recently closed navigation tab controls may be displayed in a flyout pane from a vertical tab strip, or in a drawer pane that opens vertically within a vertical tab strip. Opening of the drawer may cause other navigation tab controls in the vertical tab strip to move downward to accommodate the opened drawer.

Figure 8:
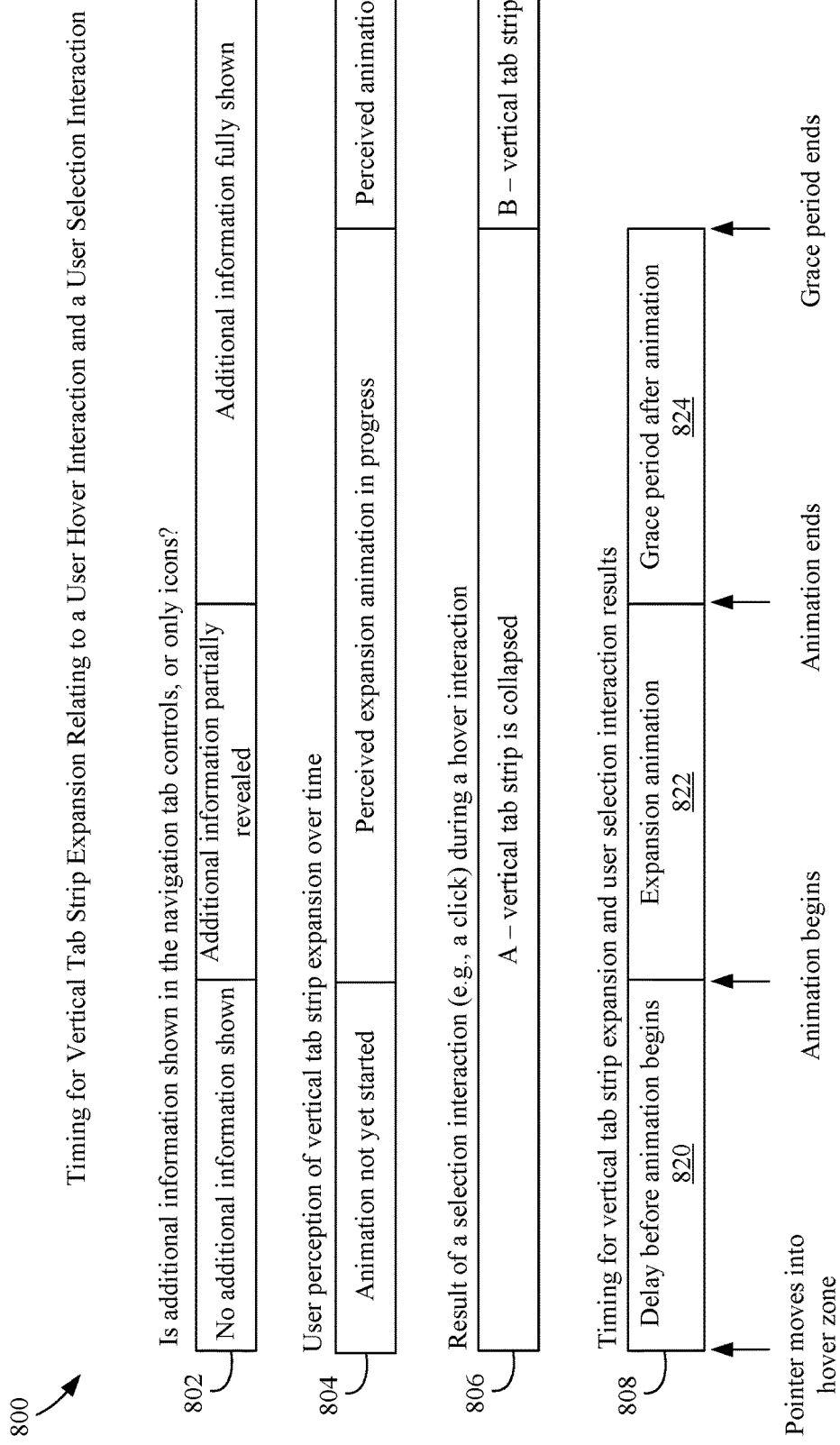
FIG. 8 is a timing diagram for expanding a vertical tabs strip in response to a user hover interaction and receiving a user selection interaction during the hover interaction, according to an example embodiment.

Embodiments for organizing and managing navigation controls using vertical tab strips in a web browser GUI may be implemented in various ways. For example, FIG. 8 is a timing diagram 300 for expanding a vertical tabs strip in response to a user hover interaction and receiving a user selection interaction during the hover interaction, according to an example embodiment.

As described above, vertical tab strips (e.g., vertical tab strips 304, 404, 504, and 604) each include one or more navigation tab controls (e.g., navigation tab controls 306 or 408), or one or more groups of tab controls (e.g., expanded groups of navigation tab controls 608 or expanded and collapsed groups of navigation tab controls 708) arranged in a vertical column. Each navigation tab control corresponds to a webpage or website that is open in web browser 106. The navigation tab controls allow a user to have quick access to a respective webpage. In response to a user selection interaction (e.g., a click or a tap) with a particular navigation tab control, tabs manager 120 is configured to display webpage content that corresponds to the selected navigation tab control in a webpage content window (e.g., webpage content window 302, 502, or 552) of web browser GUI 130.

Different users, or the same user at different times, may have conflicting preferences for displaying a vertical tab strip in an expanded state vs a collapsed state. When the vertical tab strip is in the collapsed state, the navigation tab controls may comprise only an icon. In some embodiments, an icon indicates which website a particular webpage belongs to, and it may or may not indicate the particular webpage. When multiple webpages are open from the same website, multiple icons in a vertical tab strip may have the same image, and may not indicate to a user which webpage is which. However, for a user who knows which icon they wish to select, a vertical tab strip in the collapsed state may advantageously provide a full view of the webpage content window, while providing quick access to navigation tab control icons. On the other hand, the icons alone may not provide enough information for some users to determine which icon to select. When the vertical tab trip is in the expanded state, a navigation tab control may comprise an icon plus text providing information about its corresponding webpage. As mentioned above, the text may provide a title of the corresponding webpage, descriptive information about the webpage, status information, related search information, etc. When a user is not sure which navigation tab control icon corresponds to which webpage, or if they want to see additional information about the open webpages in web browser 106, the user may prefer that the vertical tab strip remain in the expanded state. In contrast, for the user that knows which icon they want to select, the expanded state of the vertical tab strip may be annoying because it may cover some of the webpage content window and the user may have to move the mouse pointer all the way outside of the expanded vertical tab strip to terminate the hover interaction and collapse the vertical tab strip. In addition to helping users disambiguate similar navigation tab control icons or to see the additional information in an expanded tab control, keeping the vertical tab strip in the expanded state allows users to select (e.g., click on) multiple navigation tab controls to find the right one (this is helpful when even the name of the tab control doesn't provide enough information).

As described above, tabs manager 120 may be configured to convert or animate a vertical tab strip from the collapsed state to the expanded state in response to a user hover interaction with the collapsed vertical tab strip (e.g., vertical tab strip 304) and collapse an expanded or expanding vertical tab strip (e.g., vertical tab strip 404) to a collapsed state in response to the user moving the mouse pointer outside of the vertical tab strip area thereby terminating the hover interaction. Moreover, during detection of a user hover interaction within the vertical tab strip, tabs manager 120 may be configured to detect a user selection interaction with a particular navigation tab control when the vertical tab strip is in the collapsed state, the expanded state, or during an animation between the collapsed and expanded state, and display a webpage corresponding to the selected navigation tab control in the webpage content window. Depending on the timing of the user's selection interaction relative to the user hover interaction, tabs manager 120 may be configured to (1) maintain the vertical tab strip in the collapsed state, or return it to the collapsed state, after detecting the user selection interaction with a navigation tab control, or (2) display the vertical tab strip in the expanded state after detecting the user selection interaction with the navigation tab control.

As shown in FIG. 8, timing diagram 800 includes timelines 802, 804, 806, and 808. Timeline 808 includes time periods 820, 822 and 824. The timelines relate to properties of an expanding or collapsing vertical tab strip (e.g., one of vertical tab strips 304, 404, 504, or 604) and detecting a user interaction with a particular navigation tab control (e.g., of navigation tab controls 306, 408, 608, or 708) during a user hover interaction.

Timeline 808 pertains to a response by tabs manager 120 to a user hover interaction within collapsed vertical tab strip 304 and a possible user selection interaction with a particular navigation tab control (e.g., an icon) of the tab strip. Timeline 808 comprises sequential time periods 820, 822, and 824 that may be configured in system 100. Once a user controls user input device 110 and moves a pointer (e.g. a mouse pointer) into collapsed vertical tab strip 304 initiating a user hover interaction, time period 820 (or a timer 820) begins. During time period 820 and detection of the user hover interaction, tabs manager 120 is configured to delay and wait before initiating an expansion of vertical tab strip 304 that will show additional information about corresponding websites within the navigation tab controls. If tabs manager 120 detects a user selection interaction with a particular one of navigation tab control(s) 306 during the time period 820 and the user hover interaction, tabs manager 120 navigates to the webpage corresponding to the selected particular one of navigation tab control(s) 306, displays the corresponding webpage in webpage content window 302, and maintains vertical tab strip 304 in the collapsed state. In this manner, the vertical tab strip in the collapsed state, showing only icons, allows for a wider view of webpage content window 302, and does not get in the way of a user who knows which icon they wish to select.

If tabs manager 120 does not detect a user selection interaction during time period 820, and tabs manager 120 continues to detect the user hover interaction during time period 822, once time period 822 begins, tabs manager 120 is configured to begin to expand or animate open vertical tab strip 304 from the collapsed state to the expanded state of vertical tab strip 404. If tabs manager 120 detects a user selection interaction with a particular one of navigation tab control(s) 408 during time period 822, tabs manager 120 navigates to the webpage corresponding to the selected particular one of navigation tab control(s) 408, displays the corresponding webpage in webpage content window 302, and collapses or animates vertical tab strip 404 or partially opened vertical tab strip 404 to the collapsed state of vertical tab strip 304. In this manner, the vertical tab strip in the collapsed state again, showing only icons, allows for a wider view of webpage content window 302, and does not get in the way of a user who knows which icon they wish to select. If tabs manager 120 does not detect a user selection interaction with a particular navigation tab control during time period 822 and continues to detect the user hover interaction, the vertical tab strip reaches the expanded state as in vertical tab strip 404 by the end of time period 822. In this manner, a user who wishes to view the additional webpage information provided in the expanded navigation tab controls, is provided with the additional information quickly.

If tabs manager 120 continues to detect the user hover interaction after time periods 820 and 822, when the vertical tab strip is in the expanded state as in vertical tab strip 404, tabs manager 120 may provide a grace period in time period 824, in which a user is given time to select a particular one of the navigation tabs 408 and collapse the expanded vertical tab strip. For example, if vertical tabs manager 120 receives a user selection interaction with a particular one of navigation tab controls 408 during time period 824 and continued user hover interaction, vertical tabs manager 120 is configured to navigate to the webpage corresponding to the selected particular one of navigation tab control(s) 408, display the corresponding webpage in webpage content window 302, and collapse or animate vertical tab strip 404 to the collapsed state (e.g., as shown in vertical tab strip 304). In this manner, the vertical tab strip is moved out of the way of the webpage content window 302, and the user that knew which vertical tab control they wanted to select, but was slow in selecting it, is not bothered by an expanded vertical tab strip. If tabs manager 120 does not detect the user selection interaction with the particular navigation tab control during time period 824, the vertical tab strip 404 remains in the expanded state until the user moves the pointer, using user input device 110, outside of the expanded vertical tab strip 404, and thereby terminates the hover interaction. In this manner, a user who wishes to view the additional webpage information provided in the expanded navigation tab controls, is quickly and continually provided with the additional information in the expanded navigation tab controls until they choose to collapse the vertical tab strip. Moreover, after time period 824 ends and vertical tab strip 404 is in the expanded state, users can select (e.g., click on) multiple navigation tab controls in a row to find the webpage they are looking for.

In some embodiments, if tabs manager 120 detects a user selection interaction with a particular navigation tab control during the user hover interaction and any of the time periods 820, 822, and 824, tabs manager 120 may be configured to wait for a specified additional time period (not shown) before beginning time period 822 and the expansion process of the vertical tab strip, as described above. In this manner, a user may be allowed to move the pointer up and down the collapsed vertical tab strip 304, and continue selecting particular navigation tab controls (and switching to different webpages in webpage content window 302) without the vertical tab strip expanding and covering a portion of the webpage content window 302.

In one embodiment, time period 820 may comprise 200 ms, time period 822 may comprise 100 ms, and time period 824 (the grace period) may comprise 800 ms. The additional time period (not shown) for beginning time period 822 after detecting a user selection interaction with a particular navigation tab control during any of time periods 820, 822, and 824, may comprise 800 ms. However, the above described time periods are not limited to any specific time period lengths, and any suitable time period lengths may be utilized for the described time periods.

Timeline 802 shows when the webpage information, which is displayed in addition to an icon in the navigation tab controls, appears in the display as the tab strip animates to an expanded state during time period 822, and is fully expanded during grace period 824.

Time line 804 shows an example of a user's perception of whether the vertical tab strip is in a collapsed state (actually displayed during time period 820), in the process of animating open (actually displayed during time period 822), or the animation is complete (e.g., actually displayed during time period 824, where the vertical tab strip is fully expanded). As can be seen, a user's perception of the collapsed, animating, or expanded states of the vertical tab strip may not match the actual state of the vertical tab strip as shown in timeline 808. For example, a user may perceive that vertical tab strip expansion continues during time period 824 after the expansion animation has already completed. In such cases, the users delayed perception allows for an interaction model that behaves consistently according to the user's perception, even if it isn't fully consistent with respect to the coded time periods 808. For example, a user may think that selecting (e.g., clicking on) a navigation tab control in the vertical tab strip either before or during the process of expansion animation results in collapsing the vertical tab strip, while selecting a navigation tab control after the animation ends, results in the vertical tab strip remaining in the expanded state. In other words, the user may not detect that grace period 824 has been provided in order to give them additional time to act after animation has completed.

Timeline 806 shows vertical tab strip states (e.g., expanded or collapsed) that result after a user selection interaction with a particular navigation tab control during a user hover interaction, relative to the time periods of timeline 808. For example, if tabs manager 120 receives a user selection interaction with a particular navigation tab control during any of time periods 820, 822, and 824, the result is that the vertical tab strip will remain in, animate to, or change to the collapsed state. After grace period 824 ends, and tabs manager 120 receives a user selection interaction with a particular navigation tab control, tabs manager 120 is configured to maintain the vertical tab strip in the expanded state until detecting termination of the user hover interaction (e.g., where the user controls user input device 110 to move the pointer outside of the screen area of the expanded vertical tab strip). Tabs manager 120 is configured to collapse the vertical tab strip in response to the termination of the user hover interaction in the vertical tab strip screen area. In this manner, a user wishing to read the additional information displayed in the expanded navigation tab controls may take time to select a particular navigation tab control without losing the display of the additional information provided in the expanded state. Once the user hover interaction is terminated, tabs manager 120 may be configured to animate the vertical tab strip from the expanded state to the collapsed state over 100 ms. However, the disclosure is not limited in this regard, and any suitable time period may be utilized for a collapsing animation.

Figure 9:
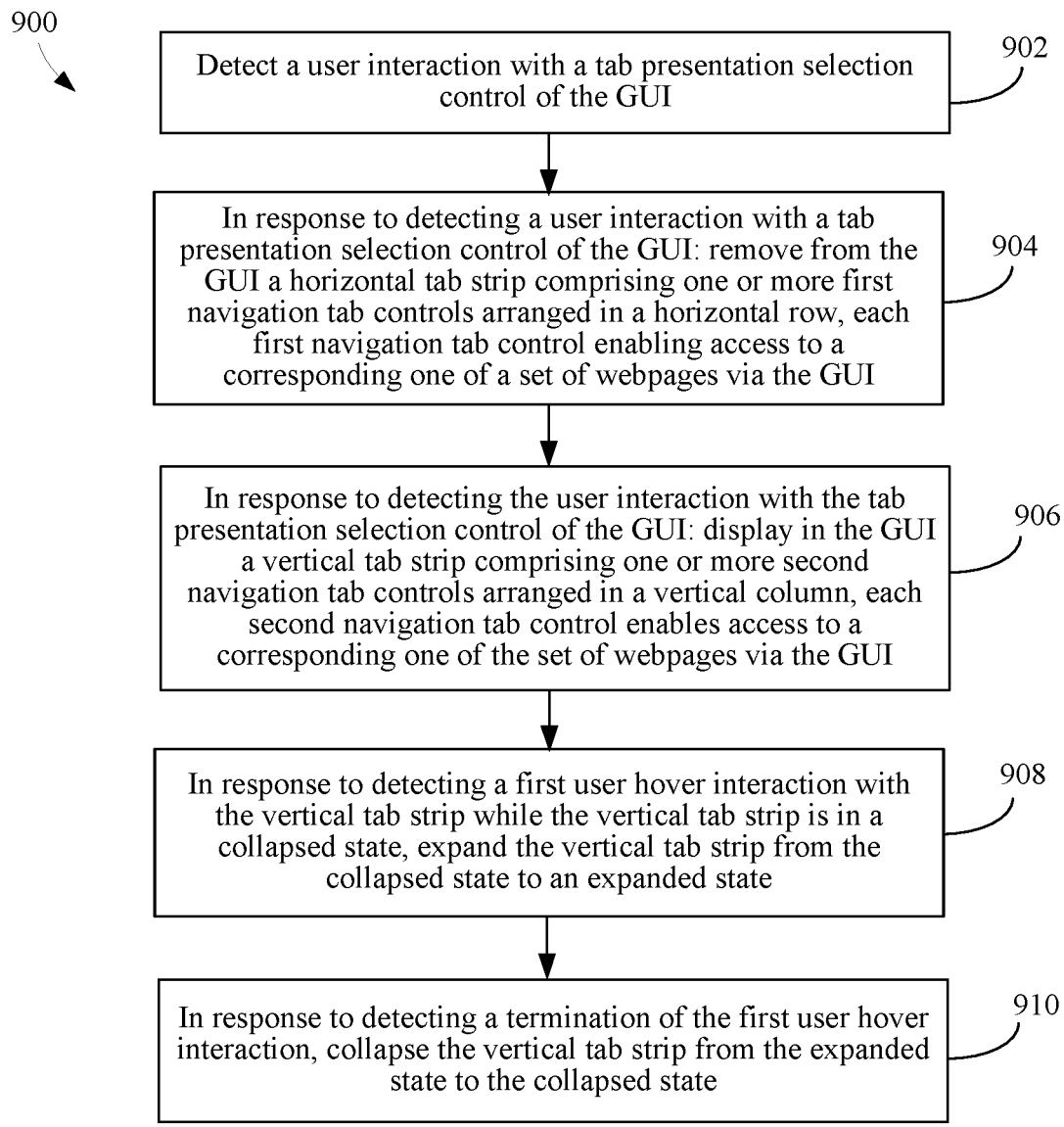
FIG. 9 is a flowchart of a method for removing a horizontal tab strip and displaying a vertical tab strip in a browser GUI, and expanding and collapsing the vertical tab strip in response to user hover interactions, according to an example embodiment.

In embodiments, system 100 may operate in various ways to perform its functions. For example, FIG. 9 is a flowchart 900 of a method for removing a horizontal tab strip and displaying a vertical tab strip in a browser GUI, and expanding and collapsing the vertical tab strip in response to user hovering interactions, according to an example embodiment.

Flowchart 900 may be performed by computing device 102. For the purpose of illustration, flowchart 900 of FIG. 9 is described with reference to FIGS. 1-7. Flowchart 900 of FIG. 9 begins with step 902. In step 902, a user interaction with a tab presentation selection control of the GUI is detected. For example, tabs manager 120 may detect a user selection interaction with tab presentation selection control 214 of web browser GUI 130.

In step 904, in response to detecting a user interaction with a tab presentation selection control of the GUI: a horizontal tab strip is removed from the GUI, the horizontal tab strip comprising one or more first navigation tab controls arranged in a horizontal row, each first navigation tab control enabling access to a corresponding one of a set of webpages via the GUI. For example, in response to detecting the user interaction with tabs presentation selection control 214 of web browser GUI 130, tabs manager 120 may remove from web browser GUI 130, horizontal tab strip 204 comprising one or more first navigation tab controls 206 arranged in a horizontal row, where each of the first navigation tab control 206 enables access to a corresponding one of a set of webpages via the web browser GUI 130.

In step 906, in response to detecting the user interaction with the tab presentation selection control of the GUI: a vertical tab strip is displayed in the GUI, the vertical tab strip comprising one or more second navigation tab controls arranged in a vertical column, each second navigation tab control enabling access to a corresponding one of the set of webpages via the GUI. For example, in response to detecting the user interaction with tab presentation selection control 214 of web browser GUI 130, tabs manager 120 may display in web browser GUI 130 vertical tab strip 304 comprising one or more second navigation tab controls 306 arranged in a vertical column, where each of the second navigation tab controls 306 enables access to a corresponding one of the set of webpages via the web browser GUI 130.

In step 908, in response to detecting a first user hover interaction with the vertical tab strip while the vertical tab strip is in a collapsed state, the vertical tab strip is expanded from the collapsed state to an expanded state. For example, in response to detecting a first user hover interaction with vertical tab strip 304 while vertical tab strip 304 is in the collapsed state, tabs manager 120 may expand vertical tab strip 304 from the collapsed state to an expanded state as vertical tab strip 404. Vertical tab strip 404 in the expanded state may overlay a portion of webpage content window 302.

In step 910, in response to detecting a termination of the first user hover interaction, the vertical tab strip is collapsed from the expanded state to the collapsed state. For example, in response to detecting a termination of the first user hover interaction, tabs manager 120 may collapse vertical tab strip 404 from the expanded state to the collapsed state as vertical tab strip 304.

The vertical tab strip in the collapsed state occupies a smaller portion of the GUI then the vertical tab strip in the expanded state. For example, vertical tab strip 304 in the collapsed state occupies a smaller portion of web browser GUI 130 than vertical tab strip 404 in the expanded state. In this regard, vertical tab strip 404 in the expanded state may cover a portion of webpage content window 302. Webpage content window 302 may be shown in full in web browser GUI 130 when vertical tab strip 304 is in the collapsed state.

Figure 10:
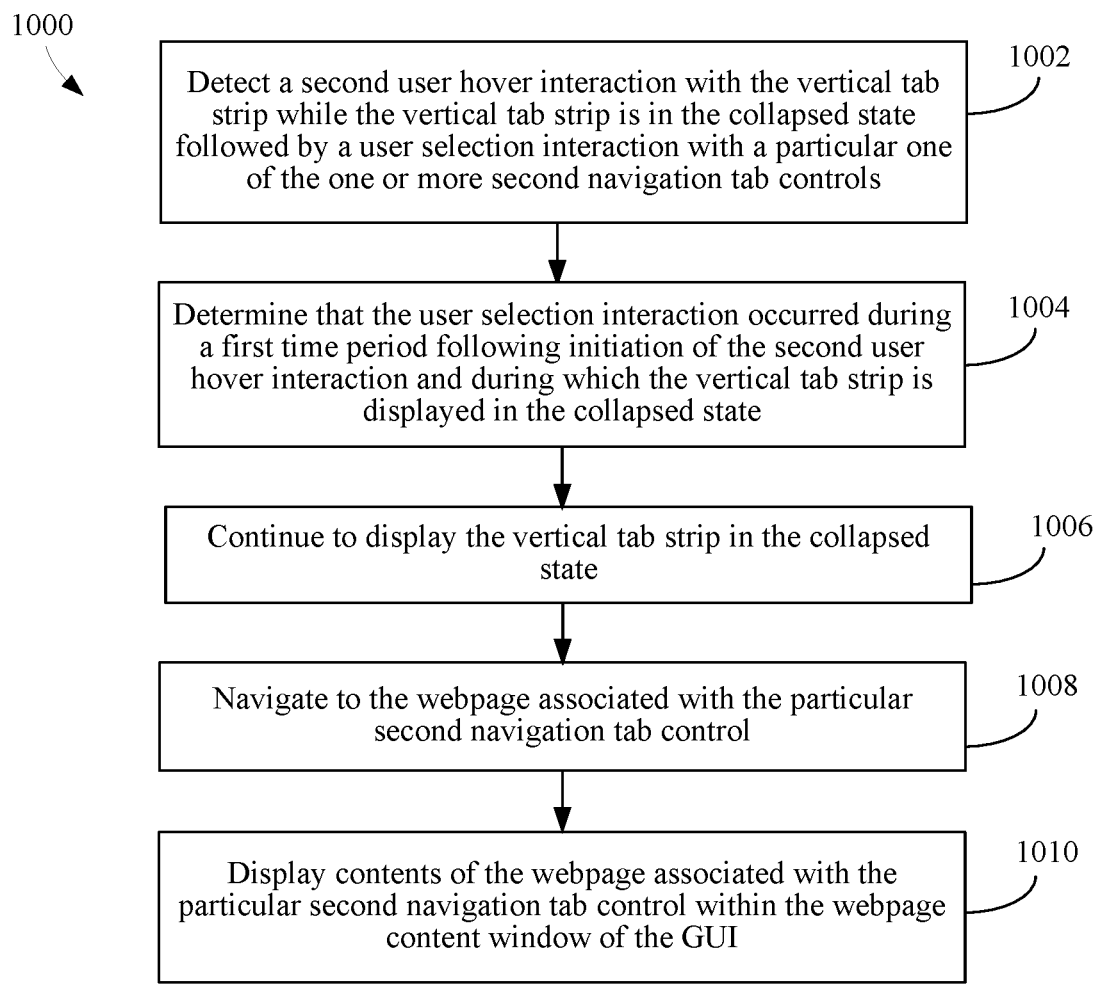
FIG. 10 is a flowchart of a method for responding to a selection of a navigation control tab occurring during a first time period of a user hover interaction over a vertical tab strip displayed in a collapsed state, according to an example embodiment.

In embodiments, system 100 may operate in various ways to perform its functions. For example, FIG. 10 is a flowchart 1000 of a method for responding to selection of a navigation control tab occurring during a first time period of a user hover interaction over a vertical tab strip displayed in a collapsed state, according to an example embodiment.

Flowchart 1000 may be performed by web browser 106 of computing device 102. For the purpose of illustration, flowchart 1000 of FIG. 10 is described with reference to FIGS. 1-8. Flowchart 1000 of FIG. 10 begins with step 1002. In step 1002, a second user hover interaction may be detected with the vertical tab strip while the vertical tab strip is in the collapsed state followed by a user selection interaction with a particular one of the one or more second navigation tab controls. For example, tabs manager 120 may detect a second user hover interaction with vertical tab strip 304 while vertical tab strip 304 is in the collapsed state followed by detection of a user selection interaction with a particular one of the one or more second navigation tab controls 306.

In step 1004, the web browser determines that the user selection interaction occurred during a first time period following initiation of the second user hover interaction and during which the vertical tab strip is displayed in the collapsed state. For example, tabs manager 120 of web browser 106 may determine that the user selection interaction with a particular one of the one or more second navigation tab controls 306 occurred during a first time period 820 following initiation of the second user hover interaction and during which the vertical tab strip 304 is displayed in the collapsed state.

In step 1006, in response to determining that the user selection interaction occurred during a first time period following initiation of the second user hover interaction and during which the vertical tab strip is displayed in the collapsed state, the web browser continues to display the vertical tab strip in the collapsed state. For example, tabs manager 120 of web browser 106 may continue to display vertical tab strip 304 in the collapsed state.

In step 1008, in response to determining that the user selection interaction occurred during a first time period following initiation of the second user hover interaction and during which the vertical tab strip is displayed in the collapsed state, the web browser navigates to the webpage associated with the particular second navigation tab control. For example, tabs manager 120 of web browser 106 may navigate to the webpage associated with the particular second navigation tab control 306.

In step 1010, in response to determining that the user selection interaction occurred during a first time period following initiation of the second user hover interaction and during which the vertical tab strip is displayed in the collapsed state, the web browser displays contents of the webpage associated with the particular second navigation tab control within the webpage content window of the GUI. For example, tabs manager 120 of web browser 106 may display contents of the webpage associated with the particular second navigation tab control within the webpage content window 302 of web browser GUI 130.

Figure 11:
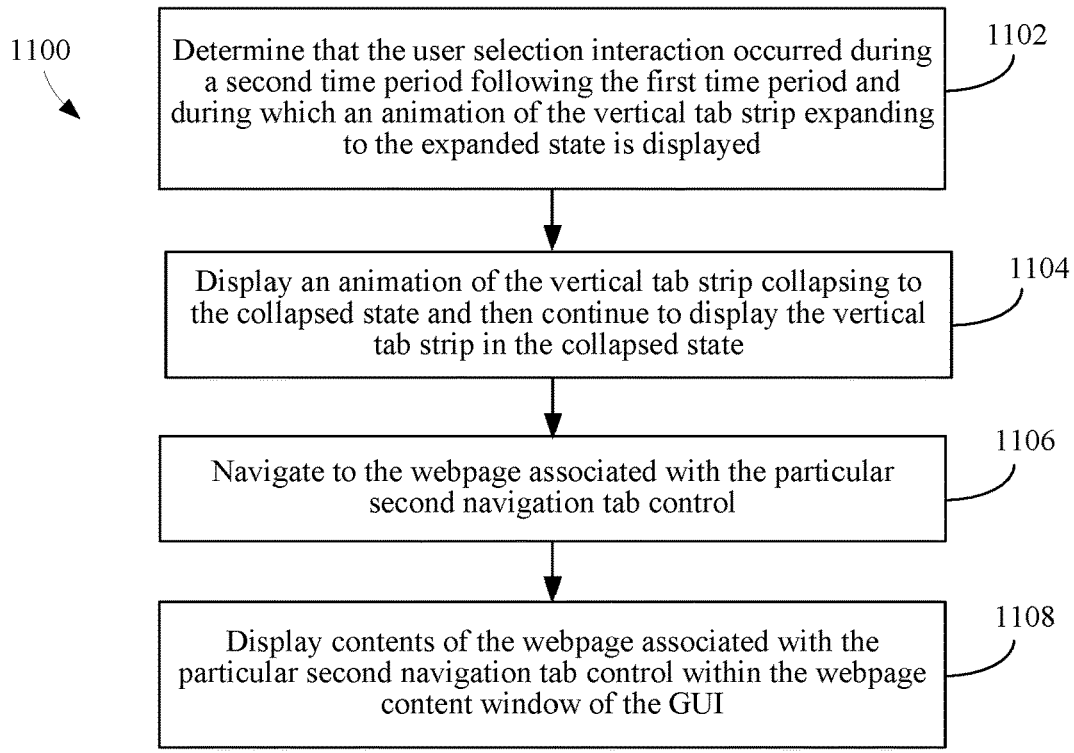
FIG. 11 is a flowchart of a method for responding to selection of a navigation control tab occurring during a second time period of a user hover interaction over a vertical tab strip displayed in an animation from a collapsed state to an expanded state, according to an example embodiment.

In embodiments, system 100 may operate in various ways to perform its functions. For example, FIG. 11 is a flowchart 1100 of a method for responding to selection of a navigation control tab occurring during a second time period of a user hover interaction over a vertical tab strip displayed in an animation between a collapsed state and an expanded state, according to an example embodiment.

Flowchart 1100 may be performed by web browser 106 of computing device 102. For the purpose of illustration, flowchart 1100 of FIG. 11 is described with reference to FIGS. 1-8. Flowchart 1100 of FIG. 11 begins with step 1102. In step 1102, the web browser determines that the user selection interaction occurred during a second time period following the first time period and during which an animation of the vertical tab strip expanding to the expanded state is displayed. For example, tabs manager 120 of web browser 106 may determine that the user selection interaction with a particular one of the one or more second navigation tab controls 408 occurred during second time period 824 following first time period 820 and during which an animation of vertical tab strip 304 expanding to the expanded state of vertical tab strip 404 is displayed.

In step 1104, in response to determining that the user selection interaction occurred during a second time period following the first time period and during which an animation of the vertical tab strip expanding to the expanded state is displayed, the web browser displays an animation of the vertical tab strip collapsing to the collapsed state and then continues to display the vertical tab strip in the collapsed state. For example, tabs manager 120 of web browser 106 is configured to display an animation of vertical tab strip 404 collapsing to the collapsed state of vertical tab strip 304. Tabs manager 120 is further configured to continue to display vertical tab strip 304 in the collapsed state.

In step 1106, in response to determining that the user selection interaction occurred during a second time period following the first time period and during which an animation of the vertical tab strip expanding to the expanded state is displayed, web browser 106 navigates to the webpage associated with the particular second navigation tab control. For example, tabs manager 120 of web browser 106 may navigate to the webpage associated with the particular second navigation tab control 408.

In step 1108, in response to determining that the user selection interaction occurred during a second time period following the first time period and during which an animation of the vertical tab strip expanding to the expanded state is displayed, the web browser displays contents of the webpage associated with the particular second navigation tab control within the webpage content window of the GUI. For example, tabs manager 120 may display contents of the webpage associated with the particular second navigation tab control 408 within the webpage content window 302 of the GUI 130. In this regard, during the animation of collapsed vertical tab strip 304 to expanded vertical tab strip 404 of time period 822, the navigation tab controls may be referred to as navigation tab controls 408.

Figure 12:
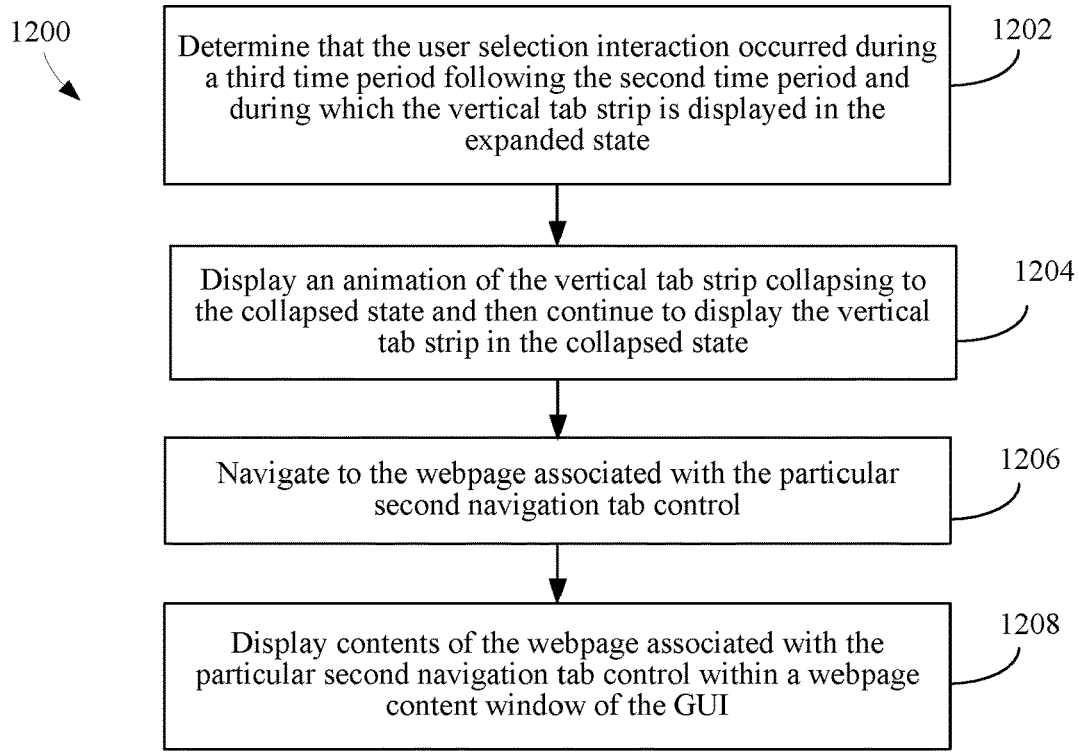
FIG. 12 is a flowchart of a method for responding to selection of a navigation control tab occurring during a third time period (i.e., a grace period) of a user hover interaction over a vertical tab strip displayed in an expanded state, according to an example embodiment.

In embodiments, system 100 may operate in various ways to perform its functions. For example, FIG. 12 is a flowchart 1200 of a method for responding to selection of a navigation control tab occurring during a third time period (i.e., a grace period) of a user hover interaction over a vertical tab strip displayed in an expanded state, according to an example embodiment.

Flowchart 1200 may be performed by web browser 106 of computing device 102. For the purpose of illustration, flowchart 1100 of FIG. 12 is described with reference to FIGS. 1-8. Flowchart 1200 of FIG. 12 begins with step 1202. In step 1202, the web browser determines that the user selection interaction occurred during a third time period following the second time period and during which the tab strip is displayed in the expanded state. For example, tabs manager 120 of web browser 106 may determine that the user selection interaction with a particular one of the one or more second navigation tab controls 408 occurred during a third time period 824 following the second time period 822, and during which vertical tab strip 404 is displayed in the expanded state.

In step 1204, in response to determining that the user selection interaction occurred during a third time period following the second time period and during which the tab strip is displayed in the expanded state, the web browser displays an animation of the vertical tab strip collapsing to the collapsed state and then continues to display the vertical tab strip in the collapsed state. For example, tabs manager 120 may display an animation of vertical tab strip 404 collapsing to the collapsed state of vertical tab strip 304. Tabs manager 120 may then continue to display vertical tab strip 304 in the collapsed state.

In step 1206, in response to determining that the user selection interaction occurred during a third time period following the second time period and during which the tab strip is displayed in the expanded state, the web browser navigates to the webpage associated with the particular second navigation tab control. For example, tabs manager 120 of web browser 106 navigates to the webpage associated with the particular second navigation tab control 408.

In step 1208, in response to determining that the user selection interaction occurred during a third time period following the second time period and during which the tab strip is displayed in the expanded state, the web browser displays contents of the webpage associated with the particular second navigation tab control within a webpage content window of the GUI. For example, tabs manager 120 of web browser 106 may display contents of the webpage associated with the particular second navigation tab control 408 within webpage content window 302 of web browser GUI 130.

Although the embodiments described above with respect to FIGS. 1-12 relate to a web browser GUI 130, the disclosure is not limited to web browser GUIs. For example, the present disclosure may apply to any user interface or software application that displays a horizontal tab bar comprising tabs that may be displayed as a vertical tab bar in a collapsed or expanded state. Each of the tabs may correspond to a display of a respective sheet, view, page, etc. Furthermore, timing diagram 800 may apply to hovering over the vertical tab bar in the collapsed state and selecting a particular tab in the vertical tab bar to switch to its corresponding sheet, view, page, etc.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

FIG. 13 is a block diagram of an example processor-based computer system 1300 that may be used to implement various embodiments. Computing device 102, display device 108, and/or user input device 110 may include any type of computing device, mobile or stationary, such as a desktop computer, a server, a video game console, etc. For example, computing device 102, display device 108, and/or user input device 110 may be any type of mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Computing device 102, display device 108, and user input device 110, may each be implemented in one or more computing devices containing features similar to those of computing device 1300 in stationary or mobile computer embodiments and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing computing device 102, display device 108, user input device 110, web browser 106, operating system 104, tabs manager 120, navigation manager 122, webpage content manager 124, display 200 of web browser GUI 130, display 300 of web browser GUI 130, display 400 of web browser GUI 130, display 500 of web browser GUI 130, display 600 of web browser GUI 130, display 700 of web browser GUI 130, webpage content window 202, webpage content window 302, webpage content window 502, webpage content window 552, horizontal tab strip 204, icon 206, navigation tab control 208, selected navigation tab control 210, tool bar 212, tab presentation selection control 214, address window 216, title bar 320, vertical tab strip 304, one or more navigation tab controls 306, open last session tab control 310, undo closed tab control 312 vertical tab strip 404, pinning control 406, one or more navigation tab controls 408, open last session tab control 410, undo closed tab control 412, collapse title bar control 420, unpin control 506, flowchart 800, flowchart 900, flowchart 1000, flowchart 1100, and/or further embodiments described herein. Program data 1336 may include navigation tab controls 306, navigation tab controls 408, expanded groups of navigation tab controls 608, expanded and collapsed groups of navigation tab controls 708, title bar 320, open last session navigation tab control 410, undo closed tab control 412, recently closed tab group 612, collapsed recently closed tab group 712, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to, or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Examples and Advantages

In an embodiment, a method for managing a graphical user interface (GUI) of a web browser comprises, in response to detecting a user interaction with a tab presentation selection control of the GUI, remove from the GUI a horizontal tab strip comprising one or more first navigation tab controls arranged in a horizontal row, where each first navigation tab control enables access to a corresponding one of a set of webpages via the GUI. The method further comprises displaying in the GUI a vertical tab strip comprising one or more second navigation tab controls arranged in a vertical column, where each second navigation tab control enables access to a corresponding one of the set of webpages via the GUI. In response to detecting a first user hover interaction with the vertical tab strip while the vertical tab strip is in a collapsed state, the vertical tab strip is expanded from the collapsed state to an expanded state. In response to detecting a termination of the first user hover interaction, the vertical tab strip is collapsed from the expanded state to the collapsed state. The vertical tab strip in the collapsed state occupies a smaller portion of the GUI then the vertical tab strip in the expanded state.

In an embodiment of the foregoing method, the vertical tab strip is expanded from the collapsed state to the expanded state and collapsed from the expanded state to the collapsed state without reflowing webpage content displayed in a webpage content window that is adjacent to the vertical tab strip and that is overlaid by the vertical tab strip in the expanded state.

In an embodiment of the foregoing method, the method further comprises in response to detecting a user pinning interaction with a pinning control in the GUI while the vertical tab strip is in the expanded state: pinning the vertical tab strip in a pinned expanded state in the GUI in response to the user pinning interaction, and reducing the size of a webpage content window that is adjacent to the vertical tab strip and reflowing webpage content displayed in the webpage content window.

In an embodiment of the foregoing method, each of the second navigation tab controls of the vertical tab strip in the collapsed state comprises an icon representing the webpage corresponding thereto without additional descriptive text relating to the webpage corresponding thereto. Each of the second navigation tab controls of the vertical tab strip in the expanded state comprises an icon representing the webpage corresponding thereto with additional descriptive text relating to the webpage corresponding thereto.

In an embodiment of the foregoing method, the vertical tab strip in the expanded state includes a recently closed tabs control. In response to detecting a user interaction with the recently closed tabs control, a set of recently closed tab controls is displayed as one of: a group within the vertical tab strip in the expanded state, a flyout pane from the vertical tab strip in the expanded state, or in a drawer of the vertical tab strip in the expanded state.

In an embodiment of the foregoing method, the detected first user hover interaction with the vertical tab strip comprises a user hover interaction having a duration that exceeds a predetermined time period.

In an embodiment of the foregoing method, the method further comprises detecting a second user hover interaction with the vertical tab strip while the vertical tab strip is in the collapsed state followed by a user selection interaction with a particular one of the one or more second navigation tab controls. In response to determining that the user selection interaction occurred during a first time period following initiation of the second user hover interaction and during which the vertical tab strip is displayed in the collapsed state: continuing to display the vertical tab strip in the collapsed state, navigating to a webpage associated with the particular second navigation tab control, and displaying contents of the webpage associated with the particular second navigation tab control within a webpage content window of the GUI.

In an embodiment of the foregoing method, the method further comprises, in response to determining that the user selection interaction occurred during a second time period following the first time period and during which an animation of the vertical tab strip expanding to the expanded state is displayed: displaying an animation of the vertical tab strip collapsing to the collapsed state and then continuing to display the vertical tab strip in the collapsed state, navigating to the webpage associated with the particular second navigation tab control, and displaying contents of the webpage associated with the particular second navigation tab control within the webpage content window of the GUI.

In an embodiment of the foregoing method, the method further comprises, in response to determining that the user selection interaction occurred during a third time period following the second time period and during which the vertical tab strip is displayed in the expanded state: displaying an animation of the vertical tab strip collapsing to the collapsed state and then continuing to display the vertical tab strip in the collapsed state, navigating to the webpage associated with the particular second navigation tab control, and displaying contents of the webpage associated with the particular second navigation tab control within a webpage content window of the GUI.

In an embodiment, a system for managing a graphical user interface (GUI) of a web browser, the system comprises one or more processors and one or more memory devices that store program code to be executed by the one or more processors. The program code comprises a tab manager configured to: in response to detecting a user interaction with a tab presentation selection control of the GUI, remove from the GUI a horizontal tab strip comprising one or more first navigation tab controls arranged in a horizontal row, where each first navigation tab control enables access to a corresponding one of a set of webpages via the GUI, and display in the GUI a vertical tab strip comprising one or more second navigation tab controls arranged in a vertical column, where each second navigation tab control enables access to a corresponding one of the set of webpages via the GUI. In response to detecting a first user hover interaction with the vertical tab strip while the vertical tab strip is in a collapsed state, the vertical tab strip is expanded from the collapsed state to an expanded state. In response to detecting a termination of the first user hover interaction, the vertical tab strip is collapsed from the expanded state to the collapsed state. The vertical tab strip in the collapsed state occupies a smaller portion of the GUI then the vertical tab strip in the expanded state.

In an embodiment of the foregoing system, the vertical tab strip is expanded from the collapsed state to the expanded state and collapsed from the expanded state to the collapsed state without reflowing webpage content displayed in a webpage content window that is adjacent to the vertical tab strip and that is overlaid by the vertical tab strip in the expanded state.

In an embodiment of the foregoing system, the tab manager is further configured to: in response to detecting a user pinning interaction with a pinning control in the GUI while the vertical tab strip is in the expanded state, pin the vertical tab strip in a pinned expanded state in the GUI, reduce the size of a webpage content window that is adjacent to the vertical tab strip, and reflow webpage content displayed in the webpage content window.

In an embodiment of the foregoing system, each of the second navigation tab controls of the vertical tab strip in the collapsed state comprises an icon representing the webpage corresponding thereto without additional descriptive text relating to the webpage corresponding thereto, and each of the second navigation tab controls of the vertical tab strip in the expanded state comprises an icon representing the webpage corresponding thereto with additional descriptive text relating to the webpage corresponding thereto.

In an embodiment of the foregoing system, the vertical tab strip in the expanded state includes a recently closed tabs control. In response to detecting a user interaction with the recently closed tabs control, a set of recently closed tab controls is displayed as one of: a group within the vertical tab strip in the expanded state, a flyout pane from the vertical tab strip in the expanded state, or in a drawer of the vertical tab strip in the expanded state.

In an embodiment of the foregoing system, the detected first user hover interaction with the vertical tab strip comprises a user hover interaction having a duration that exceeds a predetermined time period.

In an embodiment of the foregoing system, the tab manager is further configured to: detect a second user hover interaction with the vertical tab strip while the vertical tab strip is in the collapsed state followed by a user selection interaction with a particular one of the one or more second navigation tab controls. In response to determining that the user selection interaction occurred during a first time period following initiation of the second user hover interaction and during which the vertical tab strip is displayed in the collapsed state: continue to display the vertical tab strip in the collapsed state, navigate to a webpage associated with the particular second navigation tab control, and display contents of the webpage associated with the particular second navigation tab control within a webpage content window of the GUI.

In an embodiment of the foregoing system, the tab manager is further configured to: in response to determining that the user selection interaction occurred during a second time period following the first time period and during which an animation of the vertical tab strip expanding to the expanded state is displayed, display an animation of the vertical tab strip collapsing to the collapsed state and then continue to display the vertical tab strip in the collapsed state, navigate to the webpage associated with the particular second navigation tab control, and display contents of the webpage associated with the particular second navigation tab control within the webpage content window of the GUI.

In an embodiment of the foregoing system, the tab manager is further configured to: in response to determining that the user selection interaction occurred during a third time period following the second time period and during which the vertical tab strip is displayed in the expanded state, display an animation of the vertical tab strip collapsing to the collapsed state and then continuing to display the vertical tab strip in the collapsed state, navigate to the webpage associated with the particular second navigation tab control, and display contents of the webpage associated with the particular second navigation tab control within a webpage content window of the GUI.

In an embodiment, a computer-readable medium having program code recorded thereon that when executed by at least one processor causes the at least one processor to perform a method for managing a graphical user interface (GUI) of a web browser. The method comprises: in response to detecting a user interaction with a tab presentation selection control of the GUI, removing from the GUI a horizontal tab strip comprising one or more first navigation tab controls arranged in a horizontal row, where each first navigation tab control enables access to a corresponding one of a set of webpages via the GUI, and displaying in the GUI a vertical tab strip comprising one or more second navigation tab controls arranged in a vertical column, where each second navigation tab control enables access to a corresponding one of the set of webpages via the GUI. In response to detecting a first user hover interaction with the vertical tab strip while the vertical tab strip is in a collapsed state, the vertical tab strip is expanded from the collapsed state to an expanded state. In response to detecting a termination of the first user hover interaction, the vertical tab strip is collapsed from the expanded state to the collapsed state. The vertical tab strip in the collapsed state occupies a smaller portion of the GUI then the vertical tab strip in the expanded state.

In an embodiment of the foregoing computer-readable medium, each of the second navigation tab controls of the vertical tab strip in the collapsed state comprises an icon representing the webpage corresponding thereto without additional descriptive text relating to the webpage corresponding thereto, and each of the second navigation tab controls of the vertical tab strip in the expanded state comprises an icon representing the webpage corresponding thereto with additional descriptive text relating to the webpage corresponding thereto.

V. Conclusion

While various embodiments of the present application have been described above, it should be understood that they have been presented by way of example only, and not limitation. It will be understood by those skilled in the relevant art(s) that various changes in form and details may be made therein without departing from the spirit and scope of the application as defined in the appended claims. Accordingly, the breadth and scope of the present application should not be limited by any of the above-described exemplary embodiments, but should be defined only in accordance with the following claims and their equivalents.

What is claimed is:

1. A method for managing a graphical user interface (GUI) of a web browser, the method comprising:
displaying in the GUI a vertical tab strip comprising one or more navigation tab controls arranged in a vertical column, each navigation tab control of the one or more navigation tab controls enabling access to a corresponding one of a set of webpages via the GUI;
detecting a user hover interaction with the vertical tab strip while the vertical tab strip is displayed in a collapsed state;
in response to not detecting a user selection interaction with any of the one or more navigation tab controls during a first time period after the detection of the user hover interaction, displaying an animation of the vertical tab strip expanding to an expanded state during a second time period that follows the first time period while the user hover interaction is continued and wherein the second time period precedes a third time period in which the vertical tab strip is displayed in the expanded state;
in response to detecting a user selection interaction with a particular one of the one or more navigation tab controls during the second time period:
displaying an animation of the vertical tab strip collapsing to the collapsed state and then continuing to display the vertical tab strip in the collapsed state;

navigating to a webpage of the set of webpages associated with the particular navigation tab control; and displaying contents of the webpage associated with the particular navigation tab control within a webpage content window of the GUI.

2. The method of claim 1, wherein the detected user hover interaction with the vertical tab strip comprises a user hover interaction having a duration that exceeds a predetermined time period.

3. The method of claim 1, wherein the first time period and the second time period are each time periods during which the detected user hover interaction with the vertical tab strip is continued.

4. The method of claim 1, wherein the second time period comprises:
a time period during which the animation of the vertical tab strip expanding to the expanded state is displayed followed by a grace period during which the vertical tab strip is displayed in the expanded state.

5. The method of claim 1, wherein:
each of the navigation tab controls of the vertical tab strip in the collapsed state comprises an icon representing the webpage corresponding thereto without additional descriptive text relating to the webpage corresponding thereto; and
each of the navigation tab controls of the vertical tab strip in the expanded state comprises an icon representing the webpage corresponding thereto with additional descriptive text relating to the webpage corresponding thereto.

6. The method of claim 5, wherein the animation of the vertical tab strip expanding to an expanded state during the second time period partially reveals the additional descriptive text associated with each of the navigation tab controls of the vertical tab strip.

7. The method of claim 1, wherein the user selection interaction comprises a click or a tap.

8. A system for managing a graphical user interface (GUI) of a web browser, the system comprising:
one or more processors; and
one or more memory devices that store program code to be executed by the one or more processors, the program code comprising a tab manager configured to:
display in the GUI a vertical tab strip comprising one or more navigation tab controls arranged in a vertical column, each navigation tab control of the one or more navigation tab controls enabling access to a corresponding one of a set of webpages via the GUI;
detect a user hover interaction with the vertical tab strip while the vertical tab strip is displayed in a collapsed state;
in response to not detecting a user selection interaction with any of the one or more navigation tab controls during a first time period after the detection of the user hover interaction, display an animation of the vertical tab strip expanding to an expanded state during a second time period that follows the first time period while the user hover interaction is continued and wherein the second time period precedes a third time period in which the vertical tab strip is displayed in the expanded state;
in response to detecting a user selection interaction with a particular one of the one or more navigation tab controls during the second time period:
displaying an animation of the vertical tab strip collapsing to the collapsed state and then continuing to display the vertical tab strip in the collapsed state;

navigating to a webpage of the set of webpages associated with the particular navigation tab control; and displaying contents of the webpage associated with the particular navigation tab control within a webpage content window of the GUI.

9. The system of claim 8, wherein the detected user hover interaction with the vertical tab strip comprises a user hover interaction having a duration that exceeds a predetermined time period.

10. The system of claim 8, wherein the first time period and the second time period are each time periods during which the detected user hover interaction with the vertical tab strip is continued.

11. The system of claim 8, wherein the second time period comprises:
a time period during which the animation of the vertical tab strip expanding to the expanded state is displayed followed by a grace period during which the vertical tab strip is displayed in the expanded state.

12. The system of claim 8, wherein:
each of the navigation tab controls of the vertical tab strip in the collapsed state comprises an icon representing the webpage corresponding thereto without additional descriptive text relating to the webpage corresponding thereto; and
each of the navigation tab controls of the vertical tab strip in the expanded state comprises an icon representing the webpage corresponding thereto with additional descriptive text relating to the webpage corresponding thereto.

13. The system of claim 12, wherein the animation of the vertical tab strip expanding to an expanded state during the second time period partially reveals the additional descriptive text associated with each of the navigation tab controls of the vertical tab strip.

14. The system of claim 8, wherein the user selection interaction comprises a click or a tap.

15. A computer-readable storage medium having program code recorded thereon that when executed by at least one processor causes the at least one processor to perform a method for managing a graphical user interface (GUI) of a web browser, the method comprising:
displaying in the GUI a vertical tab strip comprising one or more navigation tab controls arranged in a vertical column, each navigation tab control of the one or more navigation tab controls enabling access to a corresponding one of a set of webpages via the GUI;
detecting a user hover interaction with the vertical tab strip while the vertical tab strip is displayed in a collapsed state;
in response to not detecting a user selection interaction with any of the one or more navigation tab controls during a first time period after the detection of the user hover interaction, displaying an animation of the vertical tab strip expanding to an expanded state during a second time period that follows the first time period while the user hover interaction is continued and wherein the second time period precedes a third time period in which the vertical tab strip is displayed in the expanded state;
in response to detecting a user selection interaction with a particular one of the one or more navigation tab controls during the second time period:
displaying an animation of the vertical tab strip collapsing to the collapsed state and then continuing to display the vertical tab strip in the collapsed state;

navigating to a webpage of the set of webpages associated with the particular navigation tab control; and displaying contents of the webpage associated with the particular navigation tab control within a webpage content window of the GUI.

16. The computer-readable storage medium of claim 15, wherein the detected user hover interaction with the vertical tab strip comprises a user hover interaction having a duration that exceeds a predetermined time period.

17. The computer-readable storage medium of claim 15, wherein the first time period and the second time period are each time periods during which the detected user hover interaction with the vertical tab strip is continued.

18. The computer-readable storage medium of claim 15, wherein the second time period comprises:

a time period during which the animation of the vertical tab strip expanding to the expanded state is displayed followed by a grace period during which the vertical tab strip is displayed in the expanded state.

19. The computer-readable storage medium of claim 15, wherein:

each of the navigation tab controls of the vertical tab strip in the collapsed state comprises an icon representing the webpage corresponding thereto without additional descriptive text relating to the webpage corresponding thereto; and each of the navigation tab controls of the vertical tab strip in the expanded state comprises an icon representing the webpage corresponding thereto with additional descriptive text relating to the webpage corresponding thereto.

20. The computer-readable storage medium of claim 19, wherein the animation of the vertical tab strip expanding to an expanded state during the second time period partially reveals the additional descriptive text associated with each of the navigation tab controls of the vertical tab strip.

\* \* \* \* \*